US010700325B2

United States Patent
Kusakabe et al.

(10) Patent No.: US 10,700,325 B2
(45) Date of Patent: Jun. 30, 2020

(54) NONWOVEN FABRIC SEPARATOR FOR LEAD STORAGE BATTERY, AND LEAD STORAGE BATTERY USING SAME

(71) Applicant: Asahi Kasei Kabushiki Kaisha, Tokyo (JP)

(72) Inventors: Junichi Kusakabe, Tokyo (JP); Seiichi Amano, Tokyo (JP); Kazufumi Kato, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/079,580

(22) PCT Filed: Feb. 21, 2017

(86) PCT No.: PCT/JP2017/006395
§ 371 (c)(1),
(2) Date: Aug. 24, 2018

(87) PCT Pub. No.: WO2017/150279
PCT Pub. Date: Sep. 8, 2017

(65) Prior Publication Data
US 2019/0051878 A1  Feb. 14, 2019

(30) Foreign Application Priority Data
Feb. 29, 2016  (JP) .................. 2016-037971

(51) Int. Cl.
*H01M 2/16*  (2006.01)
*H01M 10/06*  (2006.01)
*H01M 2/14*  (2006.01)
*H01M 10/08*  (2006.01)

(52) U.S. Cl.
CPC ......... *H01M 2/1613* (2013.01); *H01M 2/145* (2013.01); *H01M 2/1606* (2013.01); *H01M 2/1686* (2013.01); *H01M 10/06* (2013.01); *H01M 10/08* (2013.01); *Y02E 60/126* (2013.01)

(58) Field of Classification Search
CPC .. H01M 2/1613; H01M 2/145; H01M 2/1606; H01M 2/1686; H01M 10/06; H01M 10/08; Y02E 60/126
See application file for complete search history.

(56) References Cited

U.S. PATENT DOCUMENTS

| | | |
|---|---|---|
| 2003/0087982 A1 | 5/2003 | Kanazawa |
| 2012/0154985 A1 | 6/2012 | Kato et al. |
| 2015/0171397 A1 | 6/2015 | Yamada et al. |

FOREIGN PATENT DOCUMENTS

| | | | |
|---|---|---|---|
| JP | S57-095071 A | 6/1982 | |
| JP | S61-281454 A | 12/1986 | |
| JP | S62-064055 A | 3/1987 | |
| JP | S62-64056 A | 3/1987 | |
| JP | H06-236752 A | 8/1994 | |
| JP | 2002-260714 A | 9/2002 | |
| JP | 2011-070904 | * 4/2011 | ............. H01M 2/16 |
| JP | 2011-070904 | 4/2011 | |
| JP | 2014-160588 A | 9/2014 | |
| TW | 201403919 A | 1/2014 | |
| WO | 01/48065 A1 | 7/2001 | |
| WO | 2013/008454 A1 | 1/2013 | |

OTHER PUBLICATIONS

International Search Report issued in corresponding International Patent Application No. PCT/JP2017/006395 dated Apr. 11, 2017.
International Preliminary Report on Patentability and Written Opinion issued in corresponding International Patent Application No. PCT/JP2017/006395 dated Sep. 13, 2018.
Supplemental European Search Report issued in corresponding European Patent Application No. 17759745.7 dated Nov. 8, 2018.

* cited by examiner

*Primary Examiner* — Raymond Alejandro

(74) *Attorney, Agent, or Firm* — Morgan, Lewis & Bockius LLP

(57) ABSTRACT

A nonwoven fabric separator for a lead storage battery includes a nonwoven fabric configured with regenerated fibers or synthetic fibers. The nonwoven fabric is composed of a recycled fiber or synthetic fiber having a relationship between the average pore diameter (D) of the nonwoven fabric separator and the number of pores (N) that satisfies the following equation: $1.0 \times 10^2 < D*N < 1.0 \times 10^4$. The nonwoven fabric separator includes at least two layers which are integrated.

21 Claims, No Drawings

NONWOVEN FABRIC SEPARATOR FOR LEAD STORAGE BATTERY, AND LEAD STORAGE BATTERY USING SAME

FIELD

The present invention relates to a nonwoven fabric separator for a lead storage battery and a lead storage battery using the same.

BACKGROUND

Currently, among secondary batteries, lead storage batteries, which have been most largely produced in the world, are widely used for purposes, such as starting of engines of automobiles, motive power of forklifts and the like, and application for uninterruptible power supplies (UPS) in communication equipment.

With diversified market needs, recent years have seen development of lead storage batteries having improved functions, such as high durability, high capacity, and long-life span.

In particular, long-life battery performance is required for idling stop applications that repeat charge and discharge in a partial state of charge (PSOC) or for DC (Deep Cycle) applications where charge depth is extremely deep.

In relation to the long-life battery performance, a stratification phenomenon may be mentioned as a factor that leads to deterioration of battery performance during long-term use.

Stratification means that the concentration of sulfuric acid used as an electrolytic solution in a batter cell is different between upper and lower layers. Usually, highly concentrated sulfate ions generated due to electrode reaction precipitate. In conventional lead storage batteries that have been used to start engines of automobiles, gas is generated from an electrode surface due to electrode reaction in an overcharged state. Thus, the electrolytic solution has been stirred by a bubbling effect of the gas, whereby the stratification phenomenon has been eliminated and has been no serious concern. On the other hand, in the idling stop applications requiring use in the partial state of charge or DC applications, there occurs no reaction in the overcharged state. Thus, since the electrolytic solution is not stirred by gas, the concentration difference between the upper and lower layers is not eliminated. Near a lower layer electrode having high sulfuric acid concentration, lead sulfate is deposited, which deteriorates life performance.

As means for eliminating the stratification, control valve type lead storage batteries including a fiber-containing separator are known (see Patent Literature 1, Patent Literature 2).

Patent Literature 1 discloses a control valve type lead storage battery using a separator composed of glass fiber, an acid-resistant organic fiber such as acrylic or polyolefin, and silica. The patent literature has reported that the effect of silica on sulfate ion adsorption suppresses stratification, but has neither shown any clear effect of the organic fiber nor described details of the separator structure. In addition, the separator disclosed in the patent literature includes the glass fiber, which may be disadvantageous in that the separator is poor in flexibility and susceptible to shock.

Patent Literature 2 discloses a control valve type lead storage battery using a combination of a first separator formed by an ultrafine glass mat and a second separator formed by a synthetic fiber nonwoven fabric. While it has been reported that the control valve type lead storage battery disclosed in the patent literature has improved cycle life characteristics, neither details of structure of the synthetic fiber nor material thereof has been disclosed.

Accordingly, there is still a need for improvement in the control valve type lead storage batteries disclosed in Patent Literature 1 and Patent Literature 2, from the viewpoint of prolonging the cycle life of battery while ensuring high capacity, high output, and low resistance.

CITATION LIST

Patent Literature

Patent Literature 1: Japanese Unexamined Patent Publication (Kokai) No. 2002-260714

Patent Literature 2: Japanese Unexamined Patent Publication (Kokai) No. 2014-160588

SUMMARY

Technical Problem

In view of the above-described problems, it is an object of the present invention to provide a nonwoven fabric separator for a lead storage battery and a lead storage battery in which cycle life is prolonged while ensuring high capacity, high output, and low resistance.

Solution to Problem

The present inventors have conducted intensive and extensive studies while repeating experiments, and have consequently unexpectedly found that the aforementioned problems can be solved by the following structure, thereby having completed the present invention. Specifically, the present invention is as follows:

[1]
A nonwoven fabric separator for a lead storage battery, comprising a nonwoven fabric composed of a recycled fiber or synthetic fiber.

[2]
The separator according to the [1], wherein the nonwoven fabric separator has an average pore diameter of from 0.1 nm to 50 nm.

[3]
The separator according to the [1] or [2], wherein a relationship between the average pore diameter (D) of the nonwoven fabric separator and the number of pores (N) satisfies the following equation:

$$1.0 \times 10^2 < D*N < 1.0 \times 10^4$$

[4]
The separator according to any one of the [1] to [3], wherein the nonwoven fabric separator has a thickness of from 30 nm to 1000 nm and a weight per unit area of from 5 g/m$^2$ to 300 g/m$^2$.

[5]
The separator according to any one of the [1] to [4], wherein the nonwoven fabric separator has a porosity of from 30% to 95%.

[6]
The separator according to any one of the [1] to [5], wherein the nonwoven fabric is composed of a long fiber.

[7]
The separator according to any one of the [1] to [6], wherein the nonwoven fabric has a fiber diameter of from 0.1 nm to 30 nm.

[8]
The separator according to any one of the [1] to [7], wherein the nonwoven fabric includes an ultrafine fiber having a fiber diameter of from 0.1 nm to 5 nm.

[9]
The separator according to the [8], wherein the nonwoven fabric separator includes at least two layers including a nonwoven fabric layer (layer I) composed of the ultrafine fiber and a nonwoven fabric layer (layer II) composed of a fiber having a fiber diameter of from 5 µm to 30 µm.

[10]
The separator according to the [9], wherein the nonwoven fabric separator includes three layers in which the layer I is arranged as an intermediate layer between the layer II and the layer II.

[11]
The separator according to any one of the [1] to [10], wherein the nonwoven fabric separator is composed of the synthetic fiber.

[12]
The separator according to any one of the [1] to [11], wherein the nonwoven fabric separator is composed of a polyester fiber.

[13]
The separator according to any one of the [1] to [12], wherein the nonwoven fabric separator is composed of a polyolefin fiber.

[14]
The separator according to any one of the [1] to [13], wherein the nonwoven fabric separator is composed of a cellulose fiber.

[15]
The separator according to any one of the [1] to [14], wherein the nonwoven fabric separator has a gas permeability of from 0.01 seconds/100 cc to 10 seconds/100 cc.

[16]
The separator according to any one of the [1] to [15], wherein the nonwoven fabric separator has a tensile strength of from 15 N/15 mm to 300 N/15 mm.

[17]
The separator according to any one of the [1] to [16], wherein the nonwoven fabric separator has a specific surface area of from 0.1 $m^2/g$ to 50 $m^2/g$.

[18]
The separator according to any one of the [1] to [17], wherein the nonwoven fabric separator is a hydrophilized nonwoven fabric.

[19]
The separator according to any one of the [1] to [18], wherein the nonwoven fabric separator is a nonwoven fabric integrated by thermal bonding.

[20]
The separator according to any one of the [1] to [19], wherein the nonwoven fabric separator includes an inorganic oxide.

[21]
The separator according to any one of the [1] to [20], wherein the nonwoven fabric separator includes a nonwoven fabric substrate having a void space structure and inorganic particles present on a surface portion of the nonwoven fabric substrate or on a fiber surface inside the nonwoven fabric substrate.

[22]
The separator according to the [21], wherein the inorganic particles include a silicon component.

[23]
The separator according to the [21] or [22], wherein the inorganic particles have an average particle diameter of from 1 nm to 5000 nm.

[24]
The separator according to any one of the [21] to [23], wherein the inorganic particles have a specific surface area of from 0.1 $m^2/g$ to 1000 $m^2/g$.

[25]
The separator according to any one of the [21] to [24], wherein the nonwoven fabric separator includes a binder present inside the nonwoven fabric substrate in an amount of from 1 to 500 parts by weight with respect to 100 parts by weight of the inorganic particles.

[26]
The separator according to any one of the [1] to [25], wherein the nonwoven fabric separator is heat-sealable.

[27]
The separator according to any one of the [1] to [26], wherein the nonwoven fabric separator and a microporous membrane are laminated together.

[28]
The separator according to any one of the [1] to [27], wherein the nonwoven fabric separator and a nonwoven fabric made of glass fiber are laminated together.

[29]
A method for manufacturing the separator according to the [9], comprising a step of forming the layer I by using the ultrafine fiber by a melt-blown method.

[30]
A liquid type lead storage battery comprising an electrode plate group that includes a positive electrode, a negative electrode, and the nonwoven fabric separator according to any one of the [1] to [28] arranged between the electrodes and an electrolytic solution.

[31]
A control valve type lead storage battery having the nonwoven fabric separator according to any one of the [1] to [28].

Advantageous Effects of Invention

The nonwoven fabric separator obtained by the present invention includes the optimum material and has the highly controlled structure, and thus is excellent in ion permeability, liquid retention properties, electrical insulation properties, and chemical stability. In addition, the lead storage battery of the present invention is excellent in processing suitability as a battery, and includes a nonwoven fabric mat used in embodiments of the present invention, whereby the lead storage battery can be produced in a stable production process, with good yield, and at low cost.

Furthermore, the lead storage battery of the present invention exhibits high output and low resistance and has a very long cycle life. Note that the above description does not disclose all embodiments of the present invention and all advantages relating to the present invention.

DESCRIPTION OF EMBODIMENTS

Hereinafter, typical embodiments of the present invention will be described in more detail for exemplification. However, the present invention is not limited to these embodiments.

(Nonwoven Fabric Separator)

A nonwoven fabric separator of a present embodiment is composed of recycled fiber manufactured from natural fiber (natural polymer) as raw material or synthetic fiber purely and synthetically manufactured from an organic polymer compound.

Examples of the recycled fiber include, but are not limited to, rayon, cupra, polynosic, cellulose nanofiber, acetate of cellulose-based material, and promix of protein-based material.

Examples of the synthetic fiber include, but are not limited to, polyester-based resins, polyolefin-based resins, polyamide-based resins, polyphenylene sulfide-based resins, polyvinyl chloride, polyimide, ethylene/vinyl acetate copolymers, polyacrylonitrile, polycarbonate, polystyrene, ionomers, and mixtures thereof.

Examples of the polyester-based resins include polyethylene terephthalate (PET), polybutylene terephthalate, and polyethylene naphthalate.

Examples of the polyolefin-based resins include homopolymers or copolymers of alpha-olefins, such as ethylene, propylene, 1-butene, 1-hexene, 4-methyl-1-pentene, and 1-octene; high pressure low density polyethylene, linear low density polyethylene (LLDPE), high density polyethylene, polypropylene (propylene homopolymer), polypropylene random copolymer, poly 1-butene, poly 4-methyl-1-pentene, ethylene/propylene random copolymer, ethylene/1-butene random copolymer, and propylene/1-butene random copolymer.

Examples of the polyamide-based resins include nylon-6 (Ny), nylon-66, and polymetaxylene adipamide.

In general, as a nonwoven fabric separator for a lead storage battery, a nonwoven fabric composed of glass fiber is used. The nonwoven fabric including glass fiber is susceptible to penetration or bone bending from the viewpoint of mechanical strength (such as piercing strength), causes short-circuit, increases many process defects, and has low cycle characteristics. On the other hand, a nonwoven fabric mat composed of recycled fiber or synthetic fiber has high mechanical strength and is also excellent in processability into bags or the like, so that it is optimum. From the viewpoints of mechanical strength and processability, preferred is a nonwoven fabric separator composed of synthetic fiber. Synthetic fiber is stable even when wet with electrolytic solution, thus enabling retaining of the porous structure of separator. The nonwoven fabric having a highly controlled pore diameter physically inhibits the precipitation of sulfate ions due to specific gravity, and the sulfate ions in the lower layer are homogenized in the entire layer via the nonwoven fabric, whereby the effect of suppressing stratification becomes more remarkable.

The nonwoven fabric separator of the present embodiment is preferably composed of polyester fiber. Polyester fiber is more easily stretch-oriented than other materials, so that high single fiber strength can be obtained. Thus, polyester fiber is very suitable for a separator for a lead storage battery used in a bag shape, a cylindrical shape, or the like. Additionally, polyester fiber is chemically stable with respect to a sulfuric acid electrolytic solution having very high acidity, and also is not low in wettability. Thus, a separator including a nonwoven fabric composed of polyester fiber can maintain high ion conductivity while maintaining the porous structure unique to nonwoven fabric for a long time, so that long life span or low resistance of lead storage battery can be achieved. In that sense, more preferable polyester fiber is fiber made of polyethylene terephthalate.

The nonwoven fabric separator of the present embodiment is also preferably composed of polyolefin fiber. Polyolefin fiber has much higher acidic resistance than other materials, and exhibits very high chemical stability in sulfuric acid. Thus, a separator composed of polyolefin fiber hardly promotes decomposition reaction even when used in relatively high temperature conditions, such as in a vehicle-mounted lead storage battery, so that no strength deterioration occurs in the nonwoven fabric. In this regard, the lead storage battery can maintain the separator structure for a long time, and thus can has long life span. In that sense, more preferable polyolefin fibers are polypropylene and polyethylene.

The nonwoven fabric separator of the present embodiment is also preferably composed of cellulose fiber. Cellulose fiber, which is excellent in water absorbency, has affinity with electrolytic solution, and is excellent in retaining sulfate ions at an electrode interface. Thus, inside a battery including a separator composed of cellulose fiber, precipitation of sulfate ions due to specific gravity can be suppressed by chemisorption properties, so that the concentration inside the system is uniformly maintained, stratification hardly proceeds, and long-life span can be achieved. In addition, the separator composed of cellulose fiber is also excellent in ion permeability, and thus high capacity battery performance can be exhibited. In that sense, more preferable cellulose fibers are cupra, rayon, acetate, and cellulose nanofiber.

The nonwoven fabric separator of the present embodiment preferably includes a nonwoven fabric having a fiber diameter of from 0.1 to 30 μm. When the fiber diameter is 0.1 μm or more, the nonwoven fabric separator has low resistance and high capacity without inhibiting ion conductivity. By setting the fiber diameter to 30 μm or less, the fiber diameter is not too much large, and the fiber itself as a resin mass does not inhibit ion conductivity due to the separator between the electrodes, and becomes low resistant. In addition, when a nonwoven fabric layer having a fiber diameter of 30 μm or less is present on a surface of the separator in contact with the electrodes, electrode reaction is not inhibited.

The nonwoven fabric separator of the present embodiment particularly preferably includes a nonwoven fabric including ultrafine fiber having a fiber diameter of from 0.1 to 5 μm. This enables suppression of stratification, and enables obtaining of a separator having low resistance. When the fiber diameter is 5 μm or less, the gap between the fibers is not too large, so that sulfate ions can be effectively retained, whereby the sulfuric acid precipitation phenomenon can be suppressed, leading to suppression of stratification. In that sense, the fiber diameter of the ultrafine fiber is more preferably from 0.2 μm to 4.0 μm, and still more preferably from 0.3 μm to 3.0 μm.

The nonwoven fabric separator of the present embodiment preferably includes at least two layers including a nonwoven fabric layer (layer I) composed of ultrafine fiber having a fiber diameter of from 0.1 to 5 μm and a nonwoven fabric layer (layer II) composed of fiber having a fiber diameter of from 5 to 30 μm. In this case, the nonwoven fabric layer (layer I) composed of ultrafine fiber having a fiber diameter of from 0.1 to 5 μm plays the role of a function layer, and the nonwoven fabric layer (layer II) composed of fiber having a fiber diameter of from 5 to 30 μm plays the role of a strength layer. With the two-layer laminate nonwoven fabric including the combination of the nonwoven fabric layer (layer I) and the nonwoven fabric layer (layer II), a more dense and networked nonwoven fabric structure can be formed as compared to when each of the layers is independently used as a separator, as a result of which there can be obtained a space where a large number of sulfate ions are more uniformly retained. In particular, since the nonwoven fabric layer (layer I) is arranged in the gap between the fibers forming the nonwoven fabric layer (layer II), the fibers can be more uniformly arranged. Thus, the retained sulfate ions are supplied again to the electrodes, whereby effective electrode reaction can be made, which leads to long life span. Additionally, the separator including at least the above-mentioned two layers has the strength layer, which provides high separator strength, so that not only is facilitated post processing, but also productivity of the nonwoven fabric is significantly increased. In that sense, preferred are a two-layer structure of layer I-layer II, a three-layer structure of layer I-layer II-layer I, a three-layer structure of layer II-layer I-layer II (i.e., the three-layer structure in which the layer I is arranged as the intermediate layer between the two layers II), and a four-layer structure of layer I-layer II-layer II-layer I.

The method for manufacturing each nonwoven fabric layer used in the embodiment of the present invention is not limited. However, the method for manufacturing the nonwoven fabric layer (layer II) is preferably a spunbond method, a dry method, a wet method, or the like. The fiber for the nonwoven fabric layer (layer II) may be thermoplastic resin fiber or the like. In addition, the method for manufacturing the nonwoven fabric layer (layer I) composed of ultrafine fiber can be preferably a dry method, a wet method, or the like using the ultrafine fiber, an electrospinning method, a melt-blown method, a force spinning method, or the like. From the viewpoint that the nonwoven fabric layer composed of ultrafine fiber can be easily and densely formed, the nonwoven fabric layer (layer I) is particularly preferably formed by the melt-blown method. Additionally, the fiber may be split or fibrillated by beating, partial melting, or the like before being used to manufacture the nonwoven fabric.

Examples of the method for forming a laminate nonwoven fabric by laminating a plurality of layers including the nonwoven fabric layer (layer I) composed of ultrafine fiber and the nonwoven fabric layer (layer II) composed of thermoplastic resin fiber include a method of integrating by thermal bonding, a method of three-dimensionally entangling by jetting a high-speed water stream, and a method of integrating by a particulate or fibrous adhesive agent. Among them, integration by thermal bonding is preferable to form the laminate nonwoven fabric. Examples of the method of integrating by thermal bonding include integration by hot embossing (a hot embossing roll method) and integration by high-temperature hot air (an air-through method). Integration by thermal bonding is preferable from the viewpoint that the tensile strength and bending flexibility of the nonwoven fabric are maintained, and heat resistance stability can be maintained.

Integration by thermal bonding is also preferable in that a laminate nonwoven fabric including a plurality of nonwoven fabric layers can be formed without using any binder. In forming a laminate nonwoven fabric by integrating fibers to each other, using a binder causes elution of the binder into electrolytic solution. There is no problem as long as the binder does not affect battery performance without being involved with electrode reaction. However, depending on the binder, electrode reaction may be affected, and a desired capacity or voltage may not be able to be obtained, which is then a problem. In addition, when the pore structure unique to the nonwoven fabric is blocked by the binder, the effect of retaining sulfuric acid cannot be obtained, and stratification proceeds, which is not preferable. Due to the reasons above, preferred is a nonwoven fabric integrated by heat alone, without using any binder. Furthermore, also from the viewpoint of the rationality of steps of forming the laminate nonwoven fabric, integration by heat alone can lead to further cost reduction, which is thus preferable.

Integration by thermal bonding can be achieved by thermally adhering two or more nonwoven fabric layers. The thermal adhesion step can be performed, for example, by bonding using a flat roll at a temperature lower by from 50 to 120° C. than the melting point of a synthetic resin and at a line pressure of from 100 to 1000 N/cm. When the line pressure in the thermal adhesion step is less than 100 N/cm, it may be difficult to obtain sufficient bonding and exhibit sufficient strength. Additionally, when the line pressure is more than 1000 N/cm, fiber deformation becomes large, which increases apparent density and reduces porosity, so that the advantageous effects of the present invention may not be obtained.

The most preferable method for forming the laminate nonwoven fabric according to the present invention is a method in which a spunbond nonwoven fabric layer, a melt-blown nonwoven fabric layer and/or a spunbond nonwoven fabric layer are manufactured in order, laminated, and then press-bonded by an embossing roll or a hot press roll. The method can form a laminate nonwoven fabric by the same material, and enables production on a continuously integrated production line, so that the method is preferable to obtain a uniform nonwoven fabric having a low weight per unit area. Specifically, preferred is a method in which, by using a thermoplastic resin, one or more spunbond nonwoven fabric layers are spun onto a conveyor; thereon, by using a thermoplastic resin, one or more nonwoven fabric layers composed of ultrafine fiber having a fiber diameter of from 0.1 to 5 µm are blown by melt-blown method; then, by using a thermoplastic resin, one or more nonwoven fabric layers composed of thermoplastic resin fiber are laminated; and subsequently, these layers are press-bonded and integrated by using an embossing roll or a flat roll.

With the use of the manufacturing method, the ultrafine fiber nonwoven fabric layer (layer I) obtained by melt-blown method is directly blown onto the nonwoven fabric layer (layer II) composed of the thermoplastic resin fiber, which allows the ultrafine fiber nonwoven fabric layer (layer I) obtained by melt-blown method to be introduced into the nonwoven fabric layer (layer II) composed of the thermoplastic resin fiber. In this manner, the ultrafine fiber obtained by melt-blown method is introduced and fixed in the nonwoven fabric layer (layer II) composed of the thermoplastic resin fiber, whereby the strength of the structure itself of the laminate nonwoven fabric is improved, as well as movement of the ultrafine fiber nonwoven fabric layer (layer I) due to external force hardly occurs, so that void spaces in the nonwoven fabric layer (layer II) composed of the thermoplastic resin fiber can be made uniform by the ultrafine fiber layer. This facilitates ensuring of an appropriate interfiber distance and formation of a laminate nonwoven fabric having an appropriate pore diameter distribution. In other words, according to the above method, while a part of the layer I in the laminate nonwoven fabric enters into the layer II, the continuous layer I can be maintained, which allows smooth ion exchange including retaining of sulfate ions in the plane of the nonwoven fabric or supply thereof onto the electrode surface.

A method for manufacturing a nonwoven fabric separator including the step of forming the layer I by melt-blown method using the ultrafine fiber described above is also an embodiment of the present invention. The nonwoven fabric separator manufacturing method may include a step of integrating the layer I and the layer II by the above-described method after forming the layer I.

The degree of crystallinity of the fiber formed by melt-blown method (i.e., a melt-blown fiber) can adjusted to a range of from 5 to 40% under general melt-blown spinning conditions. Note that the degree of crystallinity can be evaluated, for example, by a method using differential scanning calorimetry (DSC). Specifically, regarding a polymer forming a laminate nonwoven fabric, the degree of crystallinity mentioned above can be achieved by using a resin that, when o-chlorophenol (OCP) is used as a solvent, has a solution viscosity ($\eta$sp/c) of preferably from 0.2 to 0.8, and more preferably from 0.2 to 0.6, as measured using a viscosity tube in a thermostatic water bath at a concentration of 0.01 g/mL and a temperature of 35° C. In the nonwoven fabric used in the present embodiment, from the viewpoint that it is preferable to have high dimensional stability when wet, a resin selected from PET resin and polyphenylene sulfide (PPS) resin is preferably used to form a melt-blown fiber. Additionally, the above-mentioned solution viscosity ($\eta$sp/c) of these resins is preferably from 0.2 to 0.8. The crystallinity of the melt-blown fiber is more preferably from 10 to 40%.

In the present embodiment, the laminate nonwoven fabric is preferably a calendered one. In this case, the laminate nonwoven fabric can be more uniform in structure. Specifically, after carrying out fiber bonding by using the above-described thermal adhesion step, calendering is carried out, as calendering processing, at a temperature higher by 10° C. or more than the above thermal adhesion temperature and lower by from 10 to 100° C. than the melting point of the thermoplastic resin fiber and at a line pressure of from 100 to 1000 N/cm. The calendering processing as above provides favorable strength to the laminate nonwoven fabric, and the apparent density thereof can be set within a particularly preferable range (e.g., within a range described in Examples of the present specification).

When the temperature of the calendering processing is lower than the melting point of the thermoplastic resin fiber and the temperature difference therebetween is less than 10° C., the apparent density tends to be too high. When the temperature thereof is lower than the melting point of the thermoplastic resin fiber and the temperature difference therebetween is more than 100° C., sufficient strength is hardly obtained, and, moreover, fluffing occurs on the surface, whereby surface smoothness is lost. Thus, it tends to be difficult to obtain a uniform structure as a capacitor element.

When the line pressure in the calendering processing is less than 100 N/cm, it is difficult to obtain sufficient adhesion, and thus sufficient strength tends to be hardly exhibited. When the line pressure is more than 1000 N/cm, fiber deformation becomes large, which increases the apparent density, so that the advantageous effects of the present invention may not be obtained.

The nonwoven fabric separator of the present embodiment is preferably composed of continuous long fiber. In the present specification, the continuous long fiber refers to a fiber defined by JIS-L0222. A nonwoven fabric composed of short fiber, in which each single fiber is not continuous, and single fiber strength is low, is weak in strength. Additionally, fiber detachment occurs in a processing step such as slitting, causing defects. By contrast, the nonwoven fabric composed of continuous long fiber has very high strength, which strength can be retained even in electrolytic solution, so that such a nonwoven fabric is optimum as a separator for a lead storage battery in which the electrodes are enveloped in a bag shape or a cylindrical shape.

The nonwoven fabric separator of the present embodiment has an average pore diameter of preferably from 0.1 to 50 µm. When the average pore diameter is larger than 50 µm, the phenomenon of sulfate ion precipitation occurs, and the gradient of sulfuric acid concentration becomes large, whereby, eventually, not only does stratification occur, but also internal short-circuit occurs, and thus the characteristics of battery are lost. When the average pore diameter is smaller than 0.1 µm, the ion conductivity between the electrodes is lowered, and resistance of the separator is increased. In this sense, the average pore diameter of the nonwoven fabric separator is more preferably from 0.3 to 40 µm, and still more preferably from 0.5 µm to 30 µm.

The product of the average pore diameter (D) and the number of pores (N) of the nonwoven fabric separator of the present embodiment is preferably from $1.0 \times 10^2$ to $1.0 \times 10^4$. The relationship between the average pore diameter and the number of pores representing the size of a space formed by the interfiber structure and the number thereof correlates with a retention ability of sulfate ions. In other words, conventionally, the stratification phenomenon has occurred in which sulfate ions generated near the electrode interface precipitate to the lower part of the system due to high specific gravity thereof. However, by disposing the nonwoven fabric in which the average pore diameter (D) and the number of pores (N) have been controlled near the electrode interface, sulfate ions can be retained in the pore structure of the nonwoven fabric, thereby preventing the stratification phenomenon (nonuniformity of sulfuric acid concentration). In that sense, D×N is in a range of more preferably from $2.5 \times 10^2$ to $7.5 \times 10^3$, and still more preferably from $5.0 \times 10^2$ to $5.0 \times 10^3$.

The nonwoven fabric separator of the present embodiment has a thickness of preferably from 30 to 1000 µm and a weight per unit area of from 5 to 300 g/m². When the thickness is more than 1000 µm, the distance between the electrodes becomes large, increasing resistance. In the case of a thickness larger than 1000 µm, the thickness per cell increases, as a result of which the number of cells that can be incorporated in the entire battery is reduced, leading to small capacity. When the thickness is less than 30 µm, the fabric cannot withstand the movement of an active material during electrode reaction, causing short circuit. In that sense, the thickness is more preferably from 40 to 900 µm, and still more preferably from 50 to 800 µm. In addition, when the weight per unit area is equal to or less than 300 g/m², the thickness of the entire nonwoven fabric is easily set within a preferable range. On the other hand, when the weight per unit area is equal to or more than 5 g/m², it is possible to have a strength that allows the nonwoven fabric to retain the electrodes in a bag shape. In that sense, the weight per unit area is more preferably from 10 to 280 g/m², and still more preferably from 20 to 250 g/m².

The nonwoven fabric separator of the present embodiment has a porosity of preferably from 30 to 95%. When the porosity of the nonwoven fabric is within the range, it is preferable from the viewpoints of the permeability of electrolytic solution, ion permeability, liquid retention amount, cycle life, and short-circuit prevention. The porosity of the nonwoven fabric can be, for example, from 40 to 90%, from 45 to 85%, or from 50 to 80%.

The nonwoven fabric separator of the present embodiment has a gas permeability of preferably from 0.01 to 10 sec/100 cc (from 0.01 to 10 seconds/100 cm³). When the gas permeability is equal to or less than 10 sec/100 cc, low resistance can be maintained without inhibiting ion conductivity. When the gas permeability is equal to or more than 0.01 sec/100 cc, the sulfuric acid precipitation effect can be suppressed.

The nonwoven fabric separator of the present embodiment has a tensile strength of the nonwoven fabric of from 15 to 300 N/15 mm from the viewpoint of handleability, defect rate reduction, and the like. When the tensile strength is equal to or more than 300 N, handling is favorable, and processing into a bag shape can be made. When the tensile strength is equal to or less than 15 N, no breakage does not occur even electrodes are inserted, and the separator can be retained in a bag shape.

The nonwoven fabric separator of the present embodiment has a specific surface area of preferably from 0.1 to 50 $m^2/g$. Regarding sulfate ions generated from the electrode surface, the sulfate ions once precipitated in the system are sucked up again on a continuous interface (such as a fiber surface or particles) present in the separator, whereby the concentration of the electrolytic solution in the battery can be controlled. Furthermore, ion mobility in a thickness direction can be improved, so that stratification can be suppressed while maintaining a battery design with less electrical resistance and high capacity. In that sense, the specific surface area is more preferably from 0.15 to 48 $m^2/g$, and still more preferably from 0.2 to 45 $m^2/g$.

The nonwoven fabric separator of the present embodiment is preferably a hydrophilized nonwoven fabric. When the nonwoven fabric is a hydrophilized one, sulfuric acid as the electrolytic solution is easily retained in the void spaces of the nonwoven fabric, so that the sulfuric acid precipitation phenomenon can be suppressed. The hydrophilized nonwoven fabric can provide a separator for a lead storage battery excellent in ion permeability and electrolytic solution retainability, which is preferable.

Examples of hydrophilization processing method that can be employed include physical processing methods such as hydrophilization by corona treatment or plasma treatment; chemical processing methods such as introduction of a surface functional group, which is, for example, introduction of a sulfonic acid group, a carboxylic acid group, or the like by oxidation treatment or the like; processing by treatment agent(s), such as a water-soluble polymer, which is, for example, polyvinyl alcohol (PVA), polystyrene sulfonic acid, or polyglutamic acid and/or a surfactant such as an nonionic surfactant, an anionic surfactant, a cationic surfactant, or an amphoteric surfactant. Those skilled in the art would be able to select an appropriate hydrophilization method and appropriate conditions, for example, such as the amount of a treatment agent to be used and the amount of a functional group to be introduced, in consideration of affinity with electrolytic solution.

The nonwoven fabric separator of the present embodiment is preferably a nonwoven fabric integrated by thermal bonding. The nonwoven fabric can be favorably formed by thermally adhering the fibers to each other in the nonwoven fabric layer by calendering processing. As the calendering processing, there may be mentioned a method of pressbonding the nonwoven fabric layer by a hot roll. This method can be carried out on a continuously integrated production line, and thus is suitable to obtain a uniform nonwoven fabric having low weight per unit area. The thermal adhesion step can be carried out, for example, at a temperature lower by from 50° C. to 120° C. than the melting point of a thermoplastic resin as a reference and at a line pressure of from 100 to 1000 N/cm. When the line pressure in the calendering processing is within the above range, it is preferable from the viewpoints of strength of the nonwoven fabric, reduction of fiber deformation, reduction of apparent density, and the like, which facilitates obtaining of a highly controlled pore distribution in the nonwoven fabric mat for a lead storage battery of the present embodiment. The hot roll used in the calendering processing may be a roll having a surface with unevenness, like an embossed or satin pattern, or may be a smooth flat roll. The surface pattern of the roll having the uneven surface is not limited as long as it is a pattern that enables the fibers to be thermally bonded to each other, such as an embossed pattern, a satin pattern, a rectangular pattern, or a line pattern.

The nonwoven fabric separator of the present embodiment preferably includes an inorganic oxide. The nonwoven fabric including an inorganic oxide has a large specific surface area, in which there are many interfaces capable of retaining sulfate ions, so that the fabric exhibits the effect of absorption. Thus, sulfuric acid precipitation phenomenon and stratification can be prevented. Preferable inorganic oxides are silicon dioxide, titanium dioxide, and zirconium dioxide. A more preferred inorganic oxide is silicon oxide. The method for arranging an inorganic oxide in the structure of the nonwoven fabric is not limited. For example, the nonwoven fabric separator is impregnated with a coating liquid (including an inorganic oxide, a solvent, a binder, and the like) by post-processing, whereby the inorganic oxide can be filled in the separator. In this case, the solvent can be any solvent as long as it can uniformly disperse inorganic fine particles, hot-melt fine particles, or the like, and can uniformly dissolve or disperse the binder. Examples of the solvent that can be used include organic solvents such as aromatic hydrocarbons such as toluene and ketones such as methyl ethyl ketone and methyl isobutyl ketone. When the binder is water-soluble and used as, for example, an emulsion, water may be used as a solvent. Note that alcohol, propylene oxide-based glycol ether, and/or the like may be added to these solvents to control interface tension.

The nonwoven fabric separator of the present embodiment is preferably heat-sealable. When processing the separator into a bag shape, employing a heat-sealable nonwoven fabric can provide high adhesion and sealing performance with extremely high strength. The method for providing heat-sealable properties is not limited. For example, heatsealable properties can be provided by arranging a twocomponent sheath-core yarn on the surface of the nonwoven fabric so that the fiber surface is made of a low-melting point material.

Coated Nonwoven Fabric Separator

A coated nonwoven fabric separator of the present embodiment preferably includes a nonwoven fabric substrate having a void space structure and inorganic particles present on the surface portion of the substrate or the fiber surface inside the substrate. The inorganic particles may form a layer in which the inorganic particles are continuously present or may form a discontinuous bulk (a mass) on the external surface of the nonwoven fabric, on the surface portion of the substrate, or on the fiber surface inside the substrate.

The coated nonwoven fabric separator of the present embodiment can be produced by using, for example, the following inorganic particle dispersed slurry, as one of raw materials. The inorganic particle dispersed slurry includes inorganic particles, a dispersion medium, and a binder.

The inorganic particles to be dispersed in the slurry are not particularly limited, but are preferably nonconductive, and more preferably chemically and electrochemically stable with respect to a material forming an electrochemical element.

Such inorganic particles may be either a synthetic product or a natural product, and can be used without any particular limitation. Examples of the inorganic particles include oxide-based ceramics such as aluminas such as gibbsite, bayerite, boehmite, and corundum, silica, titania, zirconia, magnesia, ceria, yttria, zinc oxide, and iron oxide, nitride-based ceramics such as silicon nitride, titanium nitride, and boron nitride, silicon carbide, calcium carbonate, aluminum sulfate, aluminum hydroxide, magnesium hydroxide, talc, synthetic kaolinite, kaolin clay, kaolinite, fraipontite, stevensite, dickite, nacrite, halloysite, pyrophyllite, odinite, montmorillonite, beidellite, nontronite, volkonskoite, saponite, hectorite, fluorohectorite, suconite, swinfordite, vermiculite, fluorovermiculite, berthierine, sericite, amesite, kellyite, fraiponite, brindleyite, bentonite, zeolite, biotite, phlogopite, fluorophlogopite, annite, eastonite, tainiolite, siderophyllite tetra-ferri-annite, lepidolite, tetrasilicic fluoromica, polylithionite, muscovite, celadonite, ferroceladonite, ferro-aluminoceladonite, aluminoceladonite, tobelite, paragonite, clintonite, kinoshitalite, bityite, anandite, margarite, clinochlore, chamosite, pennantite, nimite, baileychlore, donbassite, cookeite, sudoite, hydrotalcite, calcium silicate, magnesium silicate, aluminum silicate, diatomite, and quartz sand. These inorganic particles may be used singly or in combination of two or more thereof. In order to suppress the stratification of battery, it is necessary to homogenize sulfate ions in the electrolytic solution. Homogenization of the sulfate ions requires an action of suppressing the precipitation of sulfate ions discharged onto the electrode surface due to battery reaction by the separator in contact with the electrode surface or an action of diffusing the sulfate ions via the separator. Accordingly, an inorganic oxide such as alumina or silica is preferably used in order to adsorb/retain the sulfate ions at the interfaces of the inorganic particles present on the nonwoven fabric substrate. In addition, since the surface of the nonwoven fabric substrate is hydrophilized by the inorganic particles, the action of diffusing sulfate ions can be expected. Furthermore, silica is preferable in the viewpoints that particle size segmentation is possible, and the precipitation suppression action and the diffusion action can be further enhanced by using numerous interfaces of the segmented particles.

The inorganic particles have an average particle diameter of from 1 to 5000 nm. By setting the particle diameter of the inorganic particles in the slurry to 1 nm or more, the interfaces of the inorganic particles combined with the binder in the layer coated on the substrate appear on the surface (of the coating layer), and the action of adsorbing or diffusing sulfate ions can be effectively provided by the interfaces. When the particle diameter is 5000 nm or less, the number and area of the interfaces where silica is exposed on the fiber surface are maintained at a certain level or more, so that the sulfuric acid homogenization effect can be expected. In that sense, the average particle diameter is more preferably from 2 to 3000 nm, and still more preferably from 5 to 1000 nm.

The content percentage of the inorganic particles in the slurry is preferably from 1 to 80% by weight, and more preferably from 5 to 70% by weight from the viewpoints of the viscosity of the slurry, coatability, and shortening of a slurry drying step.

The inorganic particles have a specific surface area of preferably from 0.1 to 1000 $m^2/g$. By setting the specific surface area of the inorganic particles to 0.1 $m^2/g$ or more, it is possible to effectively use the particle interfaces protruding on the surface of the nonwoven fabric substrate, whereby adsorption or diffusion of sulfate ions can be effectively carried out. Additionally, by setting the specific surface area to 1000 $m^2/g$ or less, adsorption and diffusion of sulfate ions can be balanced, thereby enabling both precipitation suppression and supply to electrode surface.

The dispersion medium of the inorganic particles is preferably one that can uniformly and stably disperse the inorganic particles. Examples thereof include N-methylpyrrolidone, N,N-dimethylformamide, N,N-dimethylacetamide, water, ethanol, toluene, hot xylene, methylene chloride, and hexane. Among them, water is preferable from the viewpoint of environmental protection.

The inorganic particle dispersed slurry of the present embodiment can include a binder in order to bind inorganic particles to each other and fix the inorganic particles to the nonwoven fabric substrate. The kind of the binder is not particularly limited, but it is preferable to use a binder that is stable with respect to sulfuric acid which is electrolytic solution and that is electrochemically stable. For example, a resin binder is preferable. Specific examples thereof include polyolefin-based resins such as polyethylene, polypropylene, polybutene, and copolymers thereof and modified polyolefin resins obtained by chlorinating or acid-modifying the polyolefin-based resins; fluorine-containing resins such as polyvinylidene fluoride and polytetrafluoroethylene; fluorine-containing rubbers such as a vinylidene fluoride-hexafluoropropylene-tetrafluoroethylene copolymer, and an ethylene-tetrafluoroethylene copolymer; rubbers such as a (meth)acrylic acid-styrene-butadiene copolymer, a hydrogenated acrylonitrile-butadiene copolymer, and a hydrogenated product thereof, an acrylonitrile-butadiene-styrene copolymer and a hydrogenated product thereof, a methacrylate-acrylate copolymer, a styrene-acrylate copolymer, an acrylonitrile-acrylate copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having a melting point and/or a glass transition temperature of 18° C. or higher, such as polyphenylene ether, polysulfone, polyether sulfone, polyphenylene sulfide, polyether imide, polyamide imide, polyamide, and polyester. These resin binders may be used singly or in combination of two or more thereof. Among them, acrylic binders are more preferable from the viewpoint of adhesion of the resin binder to the substrate and the inorganic particles. The binder is not limited to those described above, and a plurality of kinds of binders may be used in combination.

The percentage of binder content in the inorganic particle dispersed slurry is preferably 1 part by weight or more, more preferably 4 parts by weight or more, and still more preferably 6 parts by weight or more with respect to 100 parts by weight of the inorganic particles, from the viewpoint of allowing the binder to bind and fix more effectively. In addition, from the viewpoint of allowing the minute interfaces of the inorganic particles to appear on the surface to effectively carry out adsorption and diffusion of sulfate ions and the viewpoint of utilizing void spaces unique to nonwoven fabric substrate to retain ion permeability, the percentage of the binder content is preferably 500 parts by weight or less, and more preferably 300 parts by weight or less, with respect to 100 parts by weight of the inorganic particles.

In order to stabilize dispersion of the inorganic particles and improve coatability, various additives such as a dispersant such as a surfactant, a thickener, a wetting agent, a defoaming agent, a preservative, a bactericide, and a pH adjustment agent containing acid or alkali may be added to the slurry. These additives are preferably those that can be removed together with solvent. However, the additives may remain in the separator as long as they are electrochemically stable in the range of use of an electrochemical element and do not inhibit battery reaction.

Examples of the dispersant such as a surfactant that can be used include various kinds of surfactants such as anionic surfactants such as sulfate type, phosphate type, carboxylic acid type, and sulfonic acid type surfactants, cationic activators such as quaternary ammonium salt type and amide amine type, amphoteric surfactants such as alkyl betaine type, amide betaine type, and amine oxide type surfactants, nonionic surfactants such as ether type, fatty acid ester type, and alkyl glucoside surfactants, and polymer type surfactants such as polyacrylic acid, polyacrylic acid salt, polysulfonic acid salt, polynaphthalene sulfonic acid salt, polyalkylene polyamine alkylene oxide, polyalkylene polyimine alkylene oxide, polyvinyl pyrrolidone, and cellulose type surfactants. In order to prevent aggregation between fillers, these may be used singly or in combination of two or more thereof. The dispersant is not limited thereto as long as the same advantageous effects as those described above can be obtained.

Furthermore, in order to control the interface tension, an alcohol such as methyl alcohol, ethyl alcohol, isopropyl alcohol, ethylene glycol, or propylene glycol and an ether such as monomethyl acetate can be added to the slurry. These may be used singly or in combination of two or more thereof. The additives for controlling the interface tension are not limited thereto as long as the same advantageous effects can be obtained.

Examples of the thickener include synthetic polymers such as polyethylene glycol, urethane-modified polyether, polyacrylic acid, polyvinyl alcohol, and a vinyl methyl ether-maleic anhydride copolymer, cellulose derivatives such as carbomethoxy cellulose, hydroxyethyl cellulose, hydroxypropyl cellulose, natural polysaccharides such as xanthan gum, diutan gum, welan gum, gellan gum, guar gum, carrageenan gum, and starches such as dextrin and pregelatinized starch. The thickener is appropriately selected from the viewpoints of the viscosity, pot life, and particle size distribution of the slurry. These are used singly or in combination of two or more thereof. The thickener is not limited thereto as long as the same advantageous effects as those described above can be obtained.

In the coated nonwoven fabric separator of the present embodiment, when the substrate is a nonwoven fabric, a wetting agent can be added to the slurry in order to improve wettability with respect to the fiber (e.g., synthetic fiber) of the nonwoven fabric to suppress the formation of pin holes. Examples of the wetting agent that can be used include sulfosuccinic acid type surfactants, aliphatic polyether type nonionic surfactants, polyoxyalkylene type nonionic surfactants, modified silicone, modified polyether, and a dimethyl siloxane polyoxyalkylene copolymer. These are used singly or in combination of two or more thereof. The wetting agent is not limited thereto as long as the same advantageous effects as those described above can be obtained.

Examples of the defoaming agent that can be used include various defoaming agents such as mineral oil-based, silicone-based, acrylic-based and polyether-based defoaming agent. These are used singly or in combination of two or more thereof. The defoaming agent is not limited thereto as long as the same advantageous effects as those described above can be obtained.

In the present embodiment, slurry can be prepared by dispersing inorganic particles in a solvent as a dispersant. The method for dissolving or dispersing inorganic particles and a binder in the solvent of the slurry is not particularly limited as long as it is a method that can achieve the dissolution or dispersion characteristics of the slurry required when coating the slurry on a substrate or the like. As the method for the dissolution or dispersion, there may be mentioned machinery stirring by a ball mill, a bead mill, a planetary ball mill, a vibrating ball mill, a sand mill, a colloid mill, an attritor, a roll mill, a high speed impeller dispersion, a disperser, a homogenizer, an ultrasonic homogenizer, a pressure type homogenizer, an ultrahigh pressure homogenizer, a high speed homogenizer, a high speed impact mill, a thin-film rotating type high speed mixer, ultrasonic dispersion, or a stirring fin.

The coated nonwoven fabric separator of the present embodiment includes the nonwoven fabric substrate having the structure with numerous void spaces. The nonwoven fabric substrate is a substrate that has spaces (pores and void spaces) thereinside.

In the coated nonwoven fabric separator of the present embodiment, the nonwoven fabric substrate is preferably composed of organic fiber. As the organic fiber, there may be mentioned a natural fiber and a recycled fiber manufactured from the natural fiber used as a raw material, a synthetic fiber purely synthetically manufactured from an organic polymer compound, or the like.

The natural fiber is not particularly limited, and examples thereof include plant fibers, cotton, hemp, Manila hemp, palm, rush, animal fiber, wool, sheep wool, and silk.

The recycled fiber is not particularly limited, and examples thereof include rayon, cupra, polynosic, cellulose nanofiber, acetate of cellulose-based material, and promix of protein-based material.

The synthetic fiber is not particularly limited, and there may be mentioned polyester-based resins, polyolefin-based resins, polyamide-based resins, polyphenylene sulfide-based resins polyvinyl chloride, polyimide, an ethylene-vinyl acetate copolymer, polyacrylonitrile, polycarbonate, polystyrene, ionomers, and mixtures thereof. Examples of the polyester-based resins include polyethylene terephthalate (PET), polybutylene terephthalate, and polyethylene naphthalate. Examples of the polyolefin-based resins include homopolymers or copolymers of $\alpha$-olefins, such as ethylene, propylene, 1-butene, 1-hexene, 4-methyl-1-pentene, and 1-octene, high pressure low density polyethylene, linear low density polyethylene (LLDPE), high density polyethylene, polypropylene (propylene homopolymer), a polypropylene random copolymer, poly 1-butene, poly 4-methyl-1-pentene, an ethylene-propylene random copolymer, an ethylene/1-butene random copolymer, and a propylene/1-butene random copolymer. Examples of the polyamide-based resins include nylon-6 (Ny), nylon-66, and polymetaxylene adipamide. A single material (e.g., polyester-based) using these resins may be used, or a blend resin as a mixture of two or more resins thereof may be used.

In general, as a separator for a lead storage battery, a nonwoven fabric composed of glass fiber is used. The nonwoven fabric including glass fiber is susceptible to penetration or bone bending from the viewpoint of mechanical strength (such as piercing strength), causes short-circuit, increases many process defects, and has low cycle characteristics. By contrast, a nonwoven fabric composed of organic fiber has high mechanical strength and is also excellent in processability into bags or the like and flexibility, so that it is optimum. Particularly, from the viewpoint of the stability of electrolytic solution, preferred is a nonwoven fabric substrate composed of synthetic fiber. Synthetic fiber has little behaviors such as swelling, and is stable even when wet with electrolytic solution, thus enabling retaining of a porous structure unique to nonwoven fabric. Accordingly, the nonwoven fabric substrate itself that serves as a base for inorganic particles has shape stability, and thus the separator has shape stability on electrolytic solution, thereby enabling successive retaining of a continuous interface by the inorganic particles.

In the coated nonwoven fabric separator of the present embodiment, the nonwoven fabric substrate is preferably composed of polyester fiber. Polyester fiber is more easily stretch-oriented than other materials, so that high single fiber strength can be obtained. Thus, polyester fiber is very suitable for a separator for a lead storage battery used in a bag shape, a cylindrical shape, or the like. Additionally, polyester fiber is chemically stable with respect to a sulfuric acid electrolytic solution having very high acidity, and also is not low in wettability. Thus, a separator including a nonwoven fabric composed of polyester fiber can maintain high ion conductivity while maintaining the porous structure unique to nonwoven fabric for a long time, so that long life span or low resistance of lead storage batteries can be achieved. Additionally, the slurry containing the inorganic particles dispersed therein has favorable coatability, thus enabling manufacturing of an easily and highly controlled separator. In that sense, among polyester fibers, polyethylene terephthalate fiber is more preferable.

In the coated nonwoven fabric separator of the present embodiment, the nonwoven fabric substrate is also preferably composed of polyolefin fiber. Polyolefin fiber has much higher acidic resistance than other materials, and exhibits very high chemical stability in sulfuric acid. Thus, a separator composed of polyolefin fiber hardly promotes decomposition reaction even when used in relatively high temperature conditions, such as in a vehicle-mounted lead storage battery, so that no strength deterioration occurs in the nonwoven fabric. In this regard, the lead storage battery can maintain the separator structure for a long time, and thus can have long life span. In that sense, more preferable polyolefin fibers are polypropylene and polyethylene.

In the coated nonwoven fabric separator of the present embodiment, the nonwoven fabric substrate is also preferably composed of cellulose fiber. Cellulose fiber, which is excellent in water absorbency, has affinity with electrolytic solution, and is excellent in retaining sulfate ions at an electrode interface. Thus, inside a battery including a separator composed of cellulose fiber, precipitation of sulfate ions due to specific gravity can be suppressed by chemisorption properties, so that the concentration inside the system is uniformly maintained, stratification hardly proceeds, and long-life span can be achieved. In addition, the separator composed of cellulose fiber is also excellent in ion permeability, and thus high capacity battery performance can be exhibited. In that sense, more preferable cellulose fibers are cupra, rayon, acetate, and cellulose nanofiber.

In the coated nonwoven fabric separator of the present embodiment, the nonwoven fabric substrate is preferably composed of continuous long fiber. In the present specification, the continuous long fiber refers to a fiber defined by JIS-L0222. In the nonwoven fabric substrate composed of continuous long fiber, the fibers are continuously connected, which is very effective in arranging the interfaces of the continuous inorganic particles on the surface thereof. This influences on the diffusibility of sulfate ions, and the more the continuous inorganic particles are arranged, the higher the sulfuric acid homogenization effect becomes. Furthermore, the separator has high nonwoven fabric strength, is sufficiently resistant to tension even in the coating step, and is optimum as a separator for a lead storage battery in which the electrodes are enveloped in a bag shape or a cylindrical shape. On the other hand, in a nonwoven fabric composed of short fiber, each single fiber is not continuous, and single fiber strength is low, so that the nonwoven fabric is weak in strength, and, additionally, fiber detachment occurs in a processing step such as slitting, causing defects.

In the coated nonwoven fabric separator of the present embodiment, the nonwoven fabric substrate has a porosity of preferably from 35 to 95%. When the porosity of the nonwoven fabric is within the range, it is preferable from the viewpoints of permeability of electrolytic solution, ion permeability, liquid retention amount, cycle life, and short-circuit prevention. When inorganic particles are coated, the particles can be sufficiently filled into the void spaces. The porosity of the nonwoven fabric can be set in a range of more preferably from 40 to 90%, and still more preferably from 45 to 85%.

In the coated nonwoven fabric separator of the present embodiment, the nonwoven fabric substrate has an average pore diameter of preferably from 0.1 to 200 μm. When the average pore diameter is larger than 200 μm, there are large pores (pores formed by fiber-to-fiber void spaces), and thus the void spaces cannot be filled even by coating inorganic particles, resulting in pin holes, which induce short circuit that is fatal to separator. Additionally, when coating the inorganic particles, strike-through is significant, and thus stable separator manufacturing cannot be carried out in continuous production. In addition, when the average pore diameter is smaller than 0.1 μm, ion conductivity between the electrodes becomes low, and resistance of the separator increases. In that sense, the average pore diameter of the nonwoven fabric separator is more preferably from 0.2 to 150 μm, and still more preferably from 0.5 μm to 100 μm.

In the coated nonwoven fabric separator of the present embodiment, the nonwoven fabric substrate has a thickness of preferably from 10 to 5000 μm and a weight per unit area of from 5 to 500 $g/m^2$. When the thickness is more than 5000 μm, the distance between the electrodes becomes large, increasing resistance. In addition, the thickness per cell increases, as a result of which the number of cells that can be incorporated in the entire battery is reduced, leading to small capacity. When the thickness is less than 10 μm, the fabric cannot withstand the movement of an active material during electrode reaction, causing short circuit. Additionally, when the weight per unit area is equal to or less than 500 $g/m^2$, the thickness of the entire nonwoven fabric can be easily set to a preferable range. On the other hand, when the weight per unit area is equal to or more than 5 $g/m^2$, it is possible to have a strength that allows the nonwoven fabric to retain the electrodes in a bag shape. In that sense, the weight per unit area is more preferably from 7 to 480 $g/m^2$, and still more preferably from 10 to 450 $g/m^2$.

In the coated nonwoven fabric separator of the present embodiment, the nonwoven fabric substrate preferably includes a nonwoven fabric including ultrafine fiber having a fiber diameter of from 0.1 to 5 μm. When the fiber diameter is 5 μm or less, the gap between the fibers is not too large, so that short circuit can be suppressed. In addition, a fiber surface area not smaller than a given size is secured. Thus, when forming inorganic particles thereon, it is possible to significantly increase the number of the interfaces. Furthermore, when the number of the interfaces is made constant, the weight per unit area of the nonwoven fabric substrate can be reduced as compared to when the fiber diameter is large, whereby a thin-film separator can be obtained. In terms of battery design, a large number of cells can be incorporated, so that high capacity and high output can be achieved. Additionally, by coating a small amount of inorganic particles, it is possible to increase the number of the interfaces even without filling so as to fill in the void spaces in the nonwoven fabric substrate, the electric resistance of the separator is greatly reduced, and the entire separator production cost can also be suppressed. When the fiber diameter is 0.1 μm or more, the gap between the fibers is not too small, so that it is possible to suppress increase in the electric resistance of the separator. In that sense, the fiber diameter of the ultrafine fiber is more preferably from 0.15 μm to 4.0 μm, and still more preferably from 0.2 μm to 3.0 μm In the coated nonwoven fabric separator of the present embodiment, the nonwoven fabric substrate preferably includes at least two layers including a nonwoven fabric layer (layer I) composed of ultrafine fiber having a fiber diameter of from 0.1 to 5 μm and a nonwoven fabric layer (layer II) composed of fiber having a fiber diameter of from 5 to 30 μm. In this case, the nonwoven fabric layer (layer I) composed of ultrafine fiber having a fiber diameter of from 0.1 to 5 μm plays the role of a function layer, and the nonwoven fabric layer (layer II) composed of fiber having a fiber diameter of from 5 to 30 μm plays the role of a strength layer. The two-layer laminate nonwoven fabric including the combination of the nonwoven fabric layer (layer I) and the nonwoven fabric layer (layer II) enables formation of a more dense and networked nonwoven fabric structure as compared to when each of the layers is independently used as a separator. In the separator coated with the inorganic particles, since sulfate ions diffuse at the interfaces thereof, the diffusion action works more uniformly and quickly, as a result of which uniformity of the sulfuric acid concentration can always be achieved. Additionally, since the nonwoven fabric layer (layer II) has large volume and number of void spaces in the separator, there can be a large number of spaces for sulfate ion adsorption, which also leads to the effect of suppressing stratification. Furthermore, since the separator including at least the above-mentioned two layers has the strength layer, separator strength is high, so that not only is facilitated post processing, but also productivity of the nonwoven fabric is highly increased. In that sense, preferred are a two-layer structure of layer I-layer II, a three-layer structure of layer I-layer II-layer I, a three-layer structure of layer II-layer I-layer II (i.e., the three-layer structure in which the layer I is arranged as the intermediate layer between the two layers II), and a four-layer structure of layer I-layer II-layer II-layer I.

In the coated nonwoven fabric separator of the present embodiment, the method for manufacturing each nonwoven fabric layer is not limited. However, the method for manufacturing the nonwoven fabric layer (layer II) is preferably a spunbond method, a dry method, a wet method, or the like. The fiber for the nonwoven fabric layer (layer II) may be thermoplastic resin fiber or the like. Additionally, as the method for manufacturing the nonwoven fabric layer (layer I) composed of ultrafine fiber, there can be preferably used a manufacturing method such as a dry method or a wet method using ultrafine fiber, an electrospinning method, a melt-blown (Melt-Blown) method, a force spinning method, or the like. From the viewpoint that the nonwoven fabric layer composed of ultrafine fiber can be easily and densely formed, the nonwoven fabric layer (layer I) is particularly preferably formed by melt-blown method. The fiber may be split or fibrillated by beating, partial melting, or the like before being used to manufacture the nonwoven fabric.

Examples of the method for forming a laminate nonwoven fabric by laminating a plurality of layers including the nonwoven fabric layer (layer I) composed of ultrafine fiber and the nonwoven fabric layer (layer II) composed of thermoplastic resin fiber include a method of integrating by thermal bonding, a method of three-dimensionally entangling by jetting a high-speed water stream, and a method of integrating by a particulate or fibrous adhesive agent. Among them, integration by thermal bonding is preferable to form the laminate nonwoven fabric. Examples of the method of integrating by thermal bonding include integration by hot embossing (a hot embossing roll method) and integration by high-temperature hot air (an air-through method). Integration by thermal bonding is preferable from the viewpoint that the tensile strength and bending flexibility of the nonwoven fabric are maintained, and heat resistance stability can be maintained.

Integration by thermal bonding is also preferable in that a laminate nonwoven fabric including a plurality of nonwoven fabric layers can be formed without using any binder. When forming a laminate nonwoven fabric by integrating fibers to each other, using a binder causes elution of the binder into electrolytic solution. There is no problem as long as the binder does not affect battery performance without being involved with electrode reaction. However, depending on the binder, electrode reaction may be affected, and a desired capacity or voltage may not be able to be obtained, which is then a problem. In addition, when the pore structure unique to the nonwoven fabric of is blocked by the binder, the surface area for arranging the inorganic particles is significantly reduced, and ideal sulfate ion adsorption and diffusion effect cannot be obtained, whereby stratification proceeds, which is not preferable. Due to the reasons above, preferred is a nonwoven fabric integrated by heat alone, without using any binder. Furthermore, also from the viewpoint of the rationality of steps of forming the laminate nonwoven fabric, integration by heat alone can lead to further cost reduction, which is thus preferable.

Integration by thermal bonding can be achieved by thermally adhering two or more nonwoven fabric layers. The thermal adhesion step can be carried out, for example, by bonding using a flat roll at a temperature lower by from 50 to 120° C. than the melting point of a synthetic resin and at a line pressure of from 100 to 1000 N/cm. When the line pressure in the thermal adhesion step is less than 100 N/cm, it may be difficult to obtain sufficient bonding and then exhibit sufficient strength. Additionally, when the line pressure is more than 1000 N/cm, fiber deformation becomes large, which increases apparent density and reduces porosity, so that the advantageous effects of the present invention may not be obtained.

In the coated nonwoven fabric separator of the present embodiment, the most preferable method for forming the laminate nonwoven fabric substrate is a method in which a spunbond nonwoven fabric layer, a melt-blown nonwoven fabric layer and/or a spunbond nonwoven fabric layer are manufactured in order, laminated, and then press-bonded by an embossing roll or a hot press roll. The method can form a laminate nonwoven fabric by the same material, and enables production on a continuously integrated production line, so that the method is preferable to obtain a uniform nonwoven fabric having a low weight per unit area. Specifically, preferred is a method in which, by using a thermoplastic resin, one or more spunbond nonwoven fabric layers are spun onto a conveyor; thereon, by using a thermoplastic resin, one or more nonwoven fabric layers composed of ultrafine fiber having a fiber diameter of from 0.1 to 5 µm are blown by melt-blown method; then, by using a thermoplastic resin, one or more nonwoven fabric layers composed of the thermoplastic resin fiber are laminated; and subsequently, these layers are press-bonded and integrated by using an embossing roll or a flat roll.

With the use of the manufacturing method, the ultrafine fiber nonwoven fabric layer (layer I) obtained by melt-blown method is directly blown onto the nonwoven fabric layer (layer II) composed of the thermoplastic resin fiber, which allows the ultrafine fiber nonwoven fabric layer (layer I) obtained by melt-blown method to be introduced into the nonwoven fabric layer (layer II) composed of the thermoplastic resin fiber. In this manner, the ultrafine fiber obtained by melt-blown method is introduced and fixed in the nonwoven fabric layer (layer II) composed of the thermoplastic resin fiber, whereby the strength of the structure itself of the laminate nonwoven fabric is improved, as well as movement of the ultrafine fiber nonwoven fabric layer (layer I) due to external force hardly occurs, so that void spaces in the nonwoven fabric layer (layer II) composed of the thermoplastic resin fiber can be made uniform by the ultrafine fiber layer. This facilitates ensuring of an appropriate interfiber distance and formation of a laminate nonwoven fabric having an appropriate pore diameter distribution. In other words, according to the above method, while a part of the layer I in the laminate nonwoven fabric enters into the layer II, the continuous layer I can be maintained, which allows smooth ion exchange including retaining of sulfate ions in the plane of the nonwoven fabric or supply thereof onto the electrode surface.

A method for manufacturing a nonwoven fabric separator including the step of forming the layer I by melt-blown method using the ultrafine fiber described above is also an embodiment of the present invention. The nonwoven fabric separator manufacturing method may include a step of integrating the layer I and the layer II by the above-described method after forming the layer I.

The degree of crystallinity of the fiber formed by melt-blown method (i.e., a melt-blown fiber) can adjusted to a range of from 5 to 40% under general melt-blown spinning conditions. Note that the degree of crystallinity can be evaluated, for example, by a method using differential scanning calorimetry (DSC). Specifically, regarding a polymer forming a laminate nonwoven fabric, the degree of crystallinity mentioned above can be achieved by using a resin that, when using o-chlorophenol (OCP) as a solvent, has a solution viscosity ($\eta sp/c$) of preferably from 0.2 to 0.8, and more preferably from 0.2 to 0.6, as measured using a viscosity tube in a thermostatic water bath at a concentration of 0.01 g/mL and a temperature of 35° C. In the nonwoven fabric used in the present embodiment, from the viewpoint that it is preferable to have high dimensional stability when wet, a resin selected from PET resin and polyphenylene sulfide (PPS) resin is preferably used to form a melt-blown fiber. Additionally, the above-mentioned solution viscosity ($\eta sp/c$) of these resins is preferably from 0.2 to 0.8. The crystallinity of the melt-blown fiber is more preferably from 10 to 40%.

In the coated nonwoven fabric separator of the present embodiment, the laminate nonwoven fabric as the nonwoven fabric substrate is preferably a calendered nonwoven fabric. In this case, the laminate nonwoven fabric can be more uniform in structure. Specifically, after carrying out fiber bonding by using the above-described thermal adhesion step, calendering is carried out, as calendering processing, at a temperature higher by 10° C. or more than the above thermal adhesion temperature and lower by from 10 to 100° C. than the melting point of the thermoplastic resin fiber and at a line pressure of from 100 to 1000 N/cm. The calendering processing as above provides favorable strength to the laminate nonwoven fabric, and the apparent density thereof can be set within a particularly preferable range (e.g., within a range described in Examples of the present specification).

When the temperature of the calendering processing is lower than the melting point of the thermoplastic resin fiber and the temperature difference therebetween is less than 10° C., the apparent density tends to be too high. When the temperature thereof is lower than the melting point of the thermoplastic resin fiber and the temperature difference therebetween is more than 100° C., it is difficult to obtain sufficient strength, and, moreover, fluffing occurs on the surface, whereby surface smoothness is lost. Thus, it tends to be difficult to obtain a uniform structure as a capacitor element.

When the line pressure in the calendering processing is less than 100 N/cm, it is difficult to obtain sufficient adhesion, and thus sufficient strength tends to be hardly exhibited. When the line pressure is more than 1000 N/cm, fiber deformation becomes large, which increases the apparent density, so that the advantageous effects of the present invention may not be obtained.

In the coated nonwoven fabric separator of the present embodiment, the nonwoven fabric substrate is preferably a hydrophilized nonwoven fabric. In the hydrophilized nonwoven fabric, sulfuric acid as electrolytic solution is easily retained in the void spaces of the nonwoven fabric, enabling suppression of the sulfuric acid precipitation phenomenon. The hydrophilized nonwoven fabric can provide a separator for a lead storage battery excellent in ion permeability and electrolytic solution retainability, which is preferable.

Examples of hydrophilization processing method that can be employed include physical processing methods, such as hydrophilization by corona treatment or plasma treatment; chemical processing methods such as introduction of a surface functional group, which is, for example, introduction of a sulfonic acid group, a carboxylic acid group, or the like by oxidation treatment or the like; processing by treatment agent(s), such as a water-soluble polymer, which is, for example, polyvinyl alcohol (PVA), polystyrene sulfonic acid, or polyglutamic acid and/or a surfactant such as an nonionic surfactant, an anionic surfactant, a cationic surfactant, or an amphoteric surfactant. Those skilled in the art would be able to select an appropriate hydrophilization method and appropriate conditions, for example, such as the amount of a treatment agent to be used and the amount of a functional group to be introduced, in consideration of affinity with electrolytic solution.

The coated nonwoven fabric separator of the present embodiment is preferably a nonwoven fabric substrate integrated by thermal bonding. The nonwoven fabric can be favorably formed by thermally adhering the fibers to each other in the nonwoven fabric layer by calendering processing. As the calendering processing, there may be mentioned a method of press-bonding the nonwoven fabric layer by a hot roll. This method can be carried out on a continuously integrated production line, and thus is suitable to obtain a uniform nonwoven fabric having low weight per unit area. The thermal adhesion step can be carried out, for example, at a temperature lower by from 50° C. to 120° C. than the melting point of a thermoplastic resin as a reference and at a line pressure of from 100 to 1000 N/cm. When the line pressure in the calendering processing is within the above range, it is preferable from the viewpoints of strength of the nonwoven fabric, reduction of fiber deformation, reduction of apparent density, and the like, which facilitates obtaining of a highly controlled pore distribution in the nonwoven fabric mat for a lead storage battery of the present embodiment. The hot roll used in the calendering processing may be a roll having an uneven surface, like an embossed or satin pattern, or may be a smooth flat roll. The surface pattern of the roll having the uneven surface is not limited as long as it is a pattern that enables the fibers to be thermally bonded to each other, such as an embossed pattern, a satin pattern, a rectangular pattern, or a line pattern.

The nonwoven fabric separator of the present embodiment may be used alone as a separator, or may be used by laminating together with another nonwoven fabric or a microporous membrane. The method for lamination is not particularly limited. It is particularly preferable to use by laminating the nonwoven fabric separator and a microporous membrane or the nonwoven fabric separator and a glass fiber nonwoven fabric.

Lamination of the nonwoven fabric separator and a microporous membrane provides a structure in which the microporous membrane that has much higher denseness and pore diameter uniformity is arranged between electrodes as compared with the nonwoven fabric alone, so that short circuit hardly occurs. Additionally, due to the lamination of the nonwoven fabric separator and the microporous membrane, the fiber is arranged at electrode interface, whereby uniformity of sulfuric acid concentration is achieved, and thus the stratification phenomenon is suppressed, enabling long life span.

When the nonwoven fabric separator and a glass fiber nonwoven fabric are laminated, it is possible to follow an electrode foil that repeats swelling and shrinkage since the glass fiber nonwoven fabric is rich in compressive elasticity, whereby the uniformity of sulfuric acid concentration can be effectively obtained by the nonwoven fabric.

A lead storage battery of the present embodiment includes a structure of lead electrode-separator-lead electrode, and uses sulfuric acid as electrolytic solution. A particularly preferable battery forms are liquid type or control valve type. Specifically, the lead storage battery includes an electrode plate group including a positive electrode, a negative electrode, and a nonwoven fabric separator arranged therebetween and sulfuric acid as an electrolytic solution.

EXAMPLES

Hereinafter, the present invention will be described more specifically with reference to Examples. However, the present invention is not limited thereto at all. Hereinafter, unless otherwise specified, the lengthwise direction of the nonwoven fabric is an MD direction (a machine direction), and the widthwise direction thereof is a direction perpendicular to the length direction.

(1) Weight per Unit Area ($g/m^2$)

According to the method specified by JIS L-1906, a test piece with 20 cm in length×25 cm in width was sampled at 3 positions per meter in the widthwise direction of the specimen and 3 positions per meter in the lengthwise direction thereof, i.e., at 9 positions per 1 m×1 m in total and measured for weights. Then, the average value of the weights was converted to a weight per unit area to obtain a weight per unit area.

(2) Thickness ($\mu m$)

According to the method specified by JIS L-1906, the thickness of the test piece was measured at 10 positions per meter in the widthwise direction thereof, and the average value of the thicknesses was obtained. The thicknesses were measured under a load of 9.8 kPa.

(3) Apparent Density ($g/cm^3$)

Using the weight per unit area ($g/m^2$) measured in the (1) and the thickness ($\mu m$) measured in the (2), apparent density was calculated, after unit adjustment, by the following equation:

Apparent density=(Weight per unit area)/(Thickness)

(4) Porosity (%)

Using the apparent density ($g/cm^3$) calculated in the (3), porosity was calculated by the following equation:

Porosity={1−(apparent density)/(resin density)}/100

(5) Fiber Diameter ($\mu m$)

A nonwoven fabric was cut into 10 cm×10 cm, and pressed against upper and lower iron plates kept at 60° C. at a pressure of 0.30 MPa for 90 seconds. Then, the nonwoven fabric was vapor-deposited with platinum. Using a SEM apparatus (JSM-6510, manufactured by JEOL Ltd.), the vapor-deposited nonwoven fabric was photographed under conditions of an acceleration voltage of 15 kV and a working distance of 21 mm. The photography magnification was set to 10000 times for yarns having an average fiber diameter of less than 0.5 $\mu m$, 6000 times for yarns having an average fiber diameter of from 0.5 $\mu m$ to less than 1.5 $\mu m$, and 4000 times for fibers having an average fiber diameter of 1.5 $\mu m$ or more. The photographic visual field at each photography magnification was set to 12.7 $\mu m \times 9.3$ $\mu m$ at 10000 times, 21.1 $\mu m \times 15.9$ $\mu m$ at 6000 times, and 31.7 $\mu m \times 23.9$ $\mu m$ at 4000 times. At least 100 fibers were randomly photographed to measure all fiber diameter lengths. However, fibers fused to each other in a yarn lengthwise direction were excluded from subjects for measurement. A weight average fiber diameter (Dw) obtained by the following equation:

$$Dw=\Sigma Wi \cdot Di=\Sigma (Ni \cdot Di^2)/(Ni \cdot Di)$$

{wherein Wi=weight fraction of fiber diameter Di=Ni·Di/ΣNi·Di} was defined as the average fiber diameter ($\mu m$).

(6) Open Pore Size Distribution (average flow rate pore diameter and maximum pore diameter)

PMI's Perm Porometer (model: CFP-1200 AEX) was used. In measurement, SILWICK manufactured by PMI Co., Ltd., was used as an immersion, and measurement was carried out after immersing a specimen in the immersion and thoroughly degassing.

In the measurement apparatus, a filter as a specimen is immersed in a liquid whose surface tension is known in advance, pressure is applied to the filter with all pores of the filter covered with the film of the liquid, and the pore diameter of the pores calculated from a pressure at which the liquid film is broken and the surface tension of the liquid is measured. The calculation uses the following mathematical equation:

$$d=C \cdot r/P$$

(wherein d (unit: $\mu m$) represents the pore diameter of the filter; r (unit: N/m) represents the surface tension of the liquid; P (unit: Pa) represents a pressure at which the liquid film having the pore diameter is broken; and c represents a constant).

From the above mathematical equation, a flow rate (a wet flow rate) is measured when a pressure P that is applied to the filter immersed in the liquid is changed continuously from low pressure to high pressure. At the initial pressure, the flow rate is 0 since even the liquid film of the largest pore is not broken. As the pressure is increased, the liquid film of the largest pore is broken, and a flow rate occurs (a bubble point). As the pressure is further increased, the flow rate increases according to each pressure. A flow rate at a pressure at which the liquid film of the smallest pore is broken is coincident with a flow rate in a dry state (a dry flow rate).

In the measurement method using the measurement apparatus, a value obtained by dividing a wet flow rate at a certain pressure by a dry flow rate at the same pressure is referred to as a cumulative filter flow rate (unit: %). The pore diameter of the liquid film broken by a pressure at which the cumulative filter flow rate is 50% is referred to as average flow rate pore diameter. The average flow rate pore diameter was defined as the average pore diameter (D) of the present invention. Additionally, the number of pores obtained at that time was defined as the number of pores (N).

The maximum pore diameter of the present invention was measured by using nonwoven fabric as the above-mentioned filter specimen, and defined to be the pore diameter of a liquid film broken at a pressure at which the cumulative filter flow rate is in a range of 50% of $-2\sigma$, i.e., a pressure at which the cumulative filter flow rate is 2.3%. For each sample, a three-point measurement was carried out by the above measurement method, and an average flow rate pore diameter as the average value, a minimum pore diameter, and a maximum pore diameter were calculated.

(7) Gas Permeability (sec/100 cc)

Gas permeability was measured based on JIS-P8117 (Gurley tester method).

(8) Tensile Strength (N/15 mm)

Each end portion of a specimen (nonwoven fabric) was removed by 10 cm, and a test piece with 3 cm in width and 20 cm in length was cut out at 5 positions per meter in width. Load was applied until the test piece was broken to obtain an average strength value of the test piece in the MD direction under maximum load (9) Piercing Strength (N)

Each end portion of a specimen (nonwoven fabric) was removed by 10 cm, and a test piece with 1.5 cm in width and 20 cm in length was cut out at 5 positions per meter in width. Load was applied to the test piece by a 100 kg compression cell at 50 m/min, and a load at which a jig pierced through the test piece was obtained as a piercing strength.

(10) Specific Surface Area

An apparatus model: Gemini 2360, manufactured by Shimadzu Corporation was used. Nonwoven fabric was rolled up into a cylindrical shape, and packed into a specific surface area measuring cell. In this case, the weight of the sample to be charged is preferably about from 0.20 to 0.60 g. The cell charged with the sample was dried for 30 minutes under the conditions of 60° C., and then cooled down for 10 minutes. After that, the cell was installed in the above specific surface area measuring apparatus, and nitrogen gas was adsorbed to sample surface to obtain a specific surface area value by applying the following equation of BET:

$$P/(V(P0-P))=1/(Vm \times C)+((C-1)/(Vm \times C))(P/P0)$$

{wherein parameters (-) relating to P0: saturated water vapor pressure (Pa), Vm: monomolecular layer adsorption amount (mg/g), C: adsorption heat, etc. are less than 0 (<0), and the present relational equation holds well, particularly, in a range of P/P0=0.05 to 0.35}. The BET equation is an equation that represents the relationship between adsorption equilibrium pressure P and adsorption amount V at the pressure in an adsorption equilibrium state at constant temperature.

(11) Measurement of Volume Resistivity ($\Omega/\square$)

As measurement apparatuses, DIGITAL SUPER MEGOHMMETER manufactured by HIOKI and a flat plate sample electrode SME-8311 manufactured by HIOKI were used. A 100 mm×100 mm test piece (nonwoven fabric) was prepared and measured for a volume resistivity value (QM) under measurement conditions of a voltage 10 V and a measurement time of 60 seconds.

(12) Measurement of Impedance

A nonwoven fabric sampled to have a diameter of 40 mm is immersed in a 40% sulfuric acid aqueous solution as electrolytic solution, and then degassed for 1 hour under reduced pressure. The sample after degassing was inserted between lead electrodes (lead and lead oxide are pasted on a lead disk having a diameter of 20 mm). A load of 12 cN was applied between the electrodes, and the electrodes and the nonwoven fabric were fixed. Next, an electrical resistance between the electrodes increased due to the insertion was defined as the electrical resistance of the nonwoven fabric, and measured (unit: $\Omega$) by using an LCR meter at 20° C. and a frequency of 100 kHz.

(13) Measurement of Liquid Retention Properties (%)

A test piece (150 mm×150 mm) of nonwoven fabric was prepared, and a dry weight (Wa) thereof was measured. The test piece was spread and immersed in sulfuric acid (specific gravity: 1.28 g/cm$^3$), and after 1 hour was taken out from the aqueous solution. Then, a test piece weight (Wb) after being left for 10 minutes in a wind-free room with a relative humidity of 65% was measured, and an electrolytic solution retention rate (%) was calculated by the following equation:

Electrolytic solution retention rate (%)=(Wa−Wb)/Wa×100

Measurement Method for Battery Performance

(14) Processing Suitability

In enclosing a positive electrode plate in a separator, separators distorted and deformed into a state swollen enough to be visually recognizable or insufficiently sealed were regarded as defective products, and a defective product rate when 1000 separators were processed was measured. The indices for processing suitability were as follows: A: less than 0.5%; B: from 0.5 to less than 1%; C: from 1% to 5%; and D: more than 5%.

(15) Initial Characteristics and Cycle Characteristics

A negative electrode plate (lead) was placed at each side of a single positive electrode plate (lead oxide) via a separator in a battery case, and then an electrolytic solution (dilute sulfuric acid having a specific gravity of 1.28) was poured to form a liquid type lead storage battery. The formed liquid type lead storage battery was repeatedly charged and discharged under the following discharging conditions and charging conditions:

Discharging conditions: 10 A (0.5 CA), lower limit voltage 10.5 V

Charging conditions (constant voltage method): maximum charging current 10 A, maximum charging voltage 14.7 V, maximum charging time 12 hours Vibration was applied to the battery in an atmosphere at 25° C. to start electrode reaction, where a cycle from discharging to charging was defined as one cycle. In that case, initial capacity was measured to confirm the presence or absence of short circuit. Additionally, the number of cycles at the time when the initial capacity was less than 80% was defined as cycle characteristics.

(16) Specific Gravity Difference of Sulfuric Acid

From upper and lower parts in the battery case, 10 mL of each solution was sampled and measured for a specific gravity of the sample, and the difference between the specific gravities of the upper and lower parts was defined as a specific gravity difference.

Example 1

A nonwoven fabric layer (layer II) composed of thermoplastic resin fiber was formed. Specifically, using a general-purpose PET (as thermoplastic resin) solution (using o-chlorophenol (OCP) as a solvent and having a solution viscosity ηsp/c of 0.67 as measured at a temperature of 35° C.) (in which the solution viscosity was measured using a viscosity tube in a thermostatic water bath kept at 35° C.; hereinafter the same), a filament group was extruded toward a moving collecting net surface by spunbond method at a spinning temperature of 300° C. and spun at a spinning speed of 4500 m/min. Next, the filament group was sufficiently opened by charging about 3 μC/g by corona charging, whereby a thermoplastic resin long fiber web was formed on the collecting net. Fiber diameter adjustment was made by changing pulling conditions to obtain a nonwoven fabric separator.

Example 2

As an ultrafine fiber nonwoven fabric layer (layer I), a PET solution (using OCP as a solvent and having a solution viscosity ηsp/c of 0.50 as measured at a temperature of 35° C.) was spun by melt-blown method under conditions of a spinning temperature of 300° C. and a heated air of 1000 Nm³/hr/m, and blown onto the above thermoplastic resin long fiber web. In this case, the distance from a melt blown nozzle to the thermoplastic resin long fiber web was set to 100 mm, suction force at a collecting surface immediately below the melt-blown nozzle was set to 0.2 kPa, and air velocity was set to 7 m/sec. Fiber diameter and the degree of crystallinity were adjusted by adjusting the amount of heated air to obtain a nonwoven fabric separator formed by the nonwoven fabric layer (layer I) composed of ultrafine fiber.

Example 3

A web was directly laminated by the same melt-blown method as described above on a continuous long fiber nonwoven fabric produced by spunbond method to form a PET-SM structure. Additionally, the structure was integrated by a calender roll, and the thickness and apparent density thereof were adjusted so as to provide a desired thickness, whereby a nonwoven fabric separator was obtained.

Example 4 and 5 to 13

A web was directly laminated by the same melt-blown method as described above on a continuous long fiber nonwoven fabric produced by spunbond method, and furthermore thereon was laminated a continuous long fiber nonwoven fabric (fiber diameter: 15 μm) produced by spunbond method to form a PET-SMS structure. Additionally, the structure was integrated by a calender roll, and the thickness and apparent density thereof were adjusted so as to provide a desired thickness, whereby each nonwoven fabric separator was obtained.

Example 14

A web was directly laminated by the same melt-blown method as described above on a continuous long fiber nonwoven fabric produced by spunbond method to form a PET-SM structure. Furthermore, thereon were sequentially laminated webs by melt-blown method and spunbond method to form a PET-SMMS structure. Finally, the structure was integrated by a calender roll, and the thickness and apparent density thereof were adjusted so as to provide a desired thickness, whereby a nonwoven fabric separator was obtained.

Examples 15, 23, and 24

Using polypropylene (PP) resin, a nonwoven fabric separator was obtained in the same manner as [Example 4].

Examples 25 and 26

Using polyethylene (PE) resin, a nonwoven fabric separator was obtained in the same manner as [Example 4].

Example 16

A cupra nonwoven fabric "BEMLIESE™" manufactured by Asahi Kasei Corporation was used as a nonwoven fabric separator. The nonwoven fabric separator was composed of cellulose (Cel) fiber.

Example 17

On a nonwoven fabric obtained by spunbond method as in [Example 1] was laminated 3 g/m² of polyester ultrafine fiber (fiber diameter: 0.01 um) obtained by electrostatic spinning (ELSP), and then the laminate was integrated by a calender roll to obtain a laminate nonwoven fabric.

Example 18

A co-PET/PET sheath-core having a fiber diameter of 16 μm was collected by spunbond method so as to obtain 20 g/m² thereof on a net, dewatered, and dried, followed by press-bonding by a flat roll to just an extent that the fiber did not come apart, whereby a short fiber web was obtained. Next, thereon was blown a melt-blown fiber for a nonwoven fabric layer (layer I) in the same manner as in [Example 4] to form an intermediate layer, and furthermore on the intermediate layer was laminated a thermoplastic resin long fiber web having the same structure as that of [Example 4], as a nonwoven fabric layer (layer II). The obtained laminate web was thermally adhered by a flat roll and a calender roll to obtain a laminate nonwoven fabric.

Examples 19 and 44

Outside the nonwoven fabric separator obtained in each of [Example 4] and [Example 31] was additionally arranged a polyethylene microporous membrane separator.

Examples 20 and 45

Outside the nonwoven fabric separator obtained in each of [Example 4] and [Example 31] was additionally arranged a glass fiber nonwoven fabric.

Examples 21 and 46

The nonwoven fabric separator obtained in each of [Example 4] and [Example 31] was coated with an aqueous solution containing colloidal silica (average particle diameter: 20 nm) and a binder (acrylic styrene-based) (colloidal silica:binder:water=40%:10%:50%) by dipping method.

Examples 22 and 47

The nonwoven fabric separator obtained in each of [Example 2] and [Example 29] was incorporated in a control valve type lead storage battery.

Examples 27 and 28

A web was directly laminated by the same melt-blown method as described above on a continuous long fiber nonwoven fabric produced by spunbond method, and furthermore thereon was laminated a continuous long fiber nonwoven fabric (fiber diameter: 15 μm) produced by spunbond method to form a PET-SMS structure. In the melt-blown layer, from the viewpoint of controlling a pore diameter, weight per unit area and fiber diameter were appropriately adjusted. Furthermore, from the viewpoint of controlling the number of pores, the structure was integrated by a calender roll having an appropriate hardness, and the thickness and apparent density thereof were adjusted to obtain each nonwoven fabric separator.

Example 29

As an ultrafine fiber nonwoven fabric layer (layer I), a PET solution (using OCP as a solvent and having a solution viscosity ηsp/c of 0.50 as measured at a temperature of 35° C.) was spun by melt-blown method under conditions of a spinning temperature of 300° C. and a heated air of 1000 Nm³/hr/m, and blown onto the above thermoplastic resin long fiber web. In this case, the distance from a melt-blown nozzle to the thermoplastic resin long fiber web was set to 100 mm, suction force at a collecting surface immediately below the melt-blown nozzle was set to 0.2 kPa, and air velocity was set to 7 m/sec. The melting temperature of the resin, the temperature of the spinning gas, the amount of the molten resin discharged per nozzle, and the like were appropriately selected to carry out drawing and thinning of the thermoplastic resin. Various conditions relating to discharge, cooling, and collection were respectively set from the viewpoint of suppressing fusion. Fiber diameter and the degree of crystallinity were adjusted by adjusting the amount of heated air to obtain a nonwoven fabric separator formed by the nonwoven fabric layer (layer I) composed of ultrafine fiber.

Example 30

A web was directly laminated by the same melt-blown method as described above on a continuous long fiber nonwoven fabric produced by spunbond method to form a PET-SM structure. However, the melting temperature of the melt-flown resin, the temperature of the spinning gas, and the amount of the molten resin discharged per nozzle, as well as various conditions relating to discharge, cooling, and collection were respectively set from the viewpoint of suppressing fusion. Furthermore, the structure was integrated by a calender roll, and the thickness and apparent density thereof were adjusted so as to provide a desired thickness to obtain a nonwoven fabric separator.

Examples 31 to 40

A web was directly laminated by the same melt-blown method as described above on a continuous long fiber nonwoven fabric produced by spunbond method, and furthermore thereon was laminated a continuous long fiber nonwoven fabric (fiber diameter: 15 μm) produced by spunbond method to form a PET-SMS structure. However, the melting temperature of the melt-flown resin, the temperature of the spinning gas, and the amount of the molten resin discharged per nozzle, as well as various conditions relating to discharge, cooling, and collection were respectively set from the viewpoint of suppressing fusion. Finally, the structure was integrated by a calender roll, and the thickness and apparent density thereof were adjusted so as to provide a desired thickness, whereby each nonwoven fabric separator was obtained.

Example 41

A web was directly laminated by the same melt-blown method as described above on a continuous long fiber nonwoven fabric produced by spunbond method to form a PET-SM structure. Furthermore, thereon were sequentially laminated webs by melt-blown method and spunbond method to form a PET-SMMS structure. However, the melting temperature of the melt-flown resin, the temperature of the spinning gas, and the amount of the molten resin discharged per nozzle, as well as various conditions relating to discharge, cooling, and collection were respectively set from the viewpoint of suppressing fusion. Finally, the structure was integrated by a calender roll, and the thickness and apparent density thereof were adjusted so as to provide a desired thickness, whereby a nonwoven fabric separator was obtained.

Example 42

Using polypropylene (PP) resin, a nonwoven fabric separator was obtained in the same manner as [Example 31].

Example 43

A co-PET/PET sheath-core having a fiber diameter of 16 μm was collected by spunbond method so as to obtain 20 g/m² thereof on a net, dewatered, and dried, followed by press-bonding by a flat roll to just an extent that the fiber did not come apart, whereby a short fiber web was obtained. Next, thereon was blown a melt-blown fiber for a nonwoven fabric layer (layer I) in the same manner as in [Example 31] to form an intermediate layer, and furthermore on the intermediate layer was laminated a thermoplastic resin long fiber web having the same structure as that of [Example 4], as a nonwoven fabric layer (layer II). The obtained laminate web was thermally adhered by a flat roll and a calender roll to obtain a laminate nonwoven fabric.

Examples 48 to 56, 58 to 63, and 66 to 70

A nonwoven fabric layer (layer II) composed of thermoplastic resin fiber was formed. Specifically, using a general-purpose PET (as thermoplastic resin) solution (using o-chlorophenol (OCP) as a solvent and having a solution viscosity ηsp/c of 0.67 as measured at a temperature of 35° C.) (in which the solution viscosity was measured using a viscosity tube in a thermostatic water bath kept at 35° C.; hereinafter the same), a filament group was extruded toward a moving collecting net surface by spunbond method at a spinning temperature of 300° C. and spun at a spinning speed of 4500 m/min. Next, the filament group was sufficiently opened by charging about 3 μC/g by corona charging to form a thermoplastic resin long fiber web on the collecting net. On the collected web was laminated an ultrafine fiber nonwoven fabric layer (layer I). Specifically, a PET solution (using OCP as a solvent and having a solution viscosity ηsp/c of 0.50 as measured at a temperature of 35° C.) was spun by melt-blown method under conditions of a spinning temperature of 300° C. and a heated air of 1000 Nm$^3$/hr/m, and blown onto the above thermoplastic resin long fiber web. In this case, the distance from a melt blown nozzle to the thermoplastic resin long fiber web was set to 100 mm, suction force at a collecting surface immediately below the melt-blown nozzle was set to 0.2 kPa, and air velocity was set to 7 m/sec. Fiber diameter and the degree of crystallinity were adjusted by adjusting the amount of heated air to obtain a nonwoven fabric having the SM structure formed by the nonwoven fabric layer (layer I) composed of ultrafine fiber on the nonwoven fabric layer (layer II). Then, on the obtained web was additionally laminated a web by the same spunbond method as described above to finally produce a nonwoven fabric having a SMS structure. Finally, the nonwoven fabric was integrated by a calender roll, and the thickness and apparent density thereof were adjusted so as to provide a desired thickness, whereby a nonwoven fabric substrate was obtained.

An inorganic particle slurry was obtained by the following method: 10 parts by weight of colloidal silica (commonly known as silica, average particle diameter: 12 nm), 1 part by weight of carboxymethyl cellulose, 2.2 parts by weight of an acrylic styrene binder (solid content concentration: 45%), 1 part by weight of a sulfosuccinic acid-based surfactant (solid content concentration: 50%), and 85.8 parts by weight of water were placed in a vessel of a non-bubbling kneader NBK-1 (trade name, manufactured by Nihonseiki Kaisha Ltd.) and dispersed under conditions of a rotational speed of 1500 rpm and a dispersion time of 5 minutes to obtain a uniform slurry.

Then, the slurry was coated on the obtained nonwoven fabric substrate by comma coating method (line speed: 10 m/min, gap: 10 μm). Additionally, the solvent was removed by drying in an oven at 80° C. to obtain a separator. The amount of the slurry to be coated was appropriately adjusted by silica content.

Example 57

For inorganic particles in the coated slurry, aluminum hydroxide (commonly known as alumina) was used.

Example 64

For a nonwoven fabric substrate, a pulp-based short fiber nonwoven fabric obtained by paper making method.

Example 65

Using polypropylene (PP), a nonwoven fabric separator was obtained in the same manner as [Example 48].

Example 71

A nonwoven fabric layer (layer II) composed of thermoplastic resin fiber was formed. Specifically, using a general-purpose PET (as thermoplastic resin) solution (using o-chlorophenol (OCP) as a solvent and having a solution viscosity ηsp/c of 0.67 as measured at a temperature of 35° C.) (in which the solution viscosity was measured using a viscosity tube in a thermostatic water bath kept at 35° C.; hereinafter the same), a filament group was extruded toward a moving collecting net surface by spunbond method at a spinning temperature of 300° C. and spun at a spinning speed of 4500 m/min. Next, the filament group was sufficiently opened by charging about 3 μC/g by corona charging to form a thermoplastic resin long fiber web on the collecting net, whereby a nonwoven fabric substrate was obtained.

Example 72

As an ultrafine fiber nonwoven fabric layer (layer I), a PET solution (using OCP as a solvent and having a solution viscosity ηsp/c of 0.50 as measured at a temperature of 35° C.) was spun by melt-blown method under conditions of a spinning temperature of 300° C. and a heated air of 1000 Nm$^3$/hr/m, and blown onto the above thermoplastic resin long fiber web. In this case, the distance from a melt blown nozzle to the thermoplastic resin long fiber web was set to 100 mm, suction force at a collecting surface immediately below the melt-blown nozzle was set to 0.2 kPa, and air velocity was set to 7 m/sec. Fiber diameter and the degree of crystallinity were adjusted by adjusting the amount of heated air to obtain a nonwoven fabric substrate formed by the nonwoven fabric layer (layer I) composed of ultrafine fiber.

Example 73

A web was directly laminated by the same melt-blown method as described above on a continuous long fiber nonwoven fabric produced by spunbond method to form a PET-SM structure. Finally, the structure was integrated by a calender roll, and the thickness and apparent density thereof were adjusted so as to provide a desired thickness, whereby a nonwoven fabric substrate was obtained.

Example 74

The cupra nonwoven fabric "BEMLIESE™" manufactured by Asahi Kasei Corporation was used as a nonwoven fabric substrate. The nonwoven fabric was composed of cellulose (Cel) fiber.

Example 75

A co-PET/PET sheath-core having a fiber diameter of 16 μm was collected by spunbond method so as to obtain 20 g/m$^2$ thereof on a net, dewatered, and dried, followed by press-bonding by a flat roll to just an extent that the fiber did not come apart, whereby a short fiber web was obtained. Next, thereon was blown a melt-blown fiber for a nonwoven fabric layer (layer I) in the same manner as in [Example 4] to form an intermediate layer, and furthermore on the intermediate layer was laminated a thermoplastic resin long fiber web having the same structure as that of [Example 51], as a nonwoven fabric layer (layer II). The obtained laminate web was thermally adhered by a flat roll and a calender roll to obtain a nonwoven fabric substrate.

Example 76

Outside the separator obtained in [Example 48] was additionally arranged a polyethylene microporous membrane separator.

Example 77

Outside the separator obtained in [Example 48] was additionally arranged a glass fiber nonwoven fabric.

Example 78

The separator obtained in [Example 72] was incorporated in a control valve type lead storage battery.

Comparative Example 1

As a separator, a polyethylene microporous membrane commercially available for a lead storage battery was used.

Comparative Example 2

As a separator, a glass mat (GM) attached with a polyethylene microporous membrane commercially available for a lead storage battery was used.

Comparative Example 3

As a separator, an AGM (absorbed glass mat) separator commercially available for a lead storage battery was incorporated in a control valve type lead storage battery.

Comparative Example 4

As a separator, a commercially available polyester fabric was used.

The following Tables 1 to 13 depict properties and evaluation results regarding the separators of Examples 1 to 78 and Comparative Examples 1 to 4.

TABLE 1

| | Properties | | | | | | | | | | | |
|---|---|---|---|---|---|---|---|---|---|---|---|---|
| | Layer II | | | Layer I | | | Layer I | | | Layer II | | |
| | Fiber type | Fiber diameter | Fiber amount | Fiber type | Fiber diameter | Fiber amount | Fiber type | Fiber diameter | Fiber amount | Fiber type | Fiber diameter | Fiber amount |
| Conditions Unit | | μm | g/m² | | μm | g/m² | | μm | g/m² | | μm | g/m² |
| EX. 1 | PET | 15 | 70 | — | — | — | — | — | — | — | — | — |
| EX. 2 | — | — | — | PET | 2.5 | 90 | — | — | — | — | — | — |
| EX. 3 | PET | 15 | 40 | PET | 2.0 | 10 | — | — | — | — | — | — |
| EX. 4 | PET | 15 | 20 | PET | 2.0 | 3 | — | — | — | PET | 15 | 20 |
| EX. 5 | PET | 15 | 20 | PET | 0.3 | 20 | — | — | — | PET | 15 | 20 |
| EX. 6 | PET | 15 | 20 | PET | 2.0 | 10 | — | — | — | PET | 15 | 20 |
| EX. 7 | PET | 15 | 20 | PET | 2.0 | 10 | — | — | — | PET | 15 | 20 |
| EX. 8 | PET | 15 | 50 | PET | 2.0 | 10 | — | — | — | PET | 15 | 50 |
| EX. 9 | PET | 15 | 15 | PET | 2.0 | 10 | — | — | — | PET | 15 | 15 |
| EX. 10 | PET | 15 | 20 | PET | 2.0 | 20 | — | — | — | PET | 15 | 20 |
| EX. 11 | PET | 15 | 20 | PET | 3.0 | 5 | — | — | — | PET | 15 | 20 |
| EX. 12 | PET | 15 | 50 | PET | 1.1 | 10 | — | — | — | PET | 15 | 50 |
| EX. 13 | PET | 15 | 15 | PET | 2.0 | 10 | — | — | — | PET | 15 | 15 |
| EX. 14 | PET | 15 | 20 | PET | 2.0 | 10 | PET | 2.0 | 10 | PET | 15 | 20 |
| EX. 15 | PP | 15 | 20 | PP | 2.0 | 10 | — | — | — | PP | 15 | 20 |
| EX. 16 | — | — | — | Cel | 3.2 | 50 | — | — | — | — | — | — |
| EX. 17 | PET | 15 | 20 | PET | 0.01 | 3 | — | — | — | PET | 15 | 20 |
| EX. 18 | PET/ Co-PET | 15 | 20 | PET | 2.0 | 10 | — | — | — | PET | 15 | 20 |
| EX. 19 | PET | 15 | 20 | PET | 2.0 | 10 | — | — | — | PET | 15 | 20 |
| EX. 20 | PET | 15 | 20 | PET | 2.0 | 10 | — | — | — | PET | 15 | 20 |
| EX. 21 | PET | 15 | 20 | PET | 2.0 | 10 | — | — | — | PET | 15 | 20 |
| EX. 22 | — | — | — | PET | 0.8 | 80 | — | — | — | — | — | — |

TABLE 2

| | Total weight per unit area | Apparent density | Thickness | Porosity | Minimum pore diameter | Average pore diameter (D) | Maximum pore diameter | Number of pores (N) | D × N | Gas permeability | Tensile strength | Piercing strength |
|---|---|---|---|---|---|---|---|---|---|---|---|---|
| Conditions | | AVE. | | | | | | | | | width 15 mm | |
| Unit | g/m² | g/cm³ | mm | | μm | μm | μm | | | sec/ 100 mL | N | N |
| EX. 1 | 70 | 0.58 | 0.12 | 58% | 5.3 | 12.4 | 41.2 | 259 | 3212 | 0.0 | 143 | 38 |
| EX. 2 | 90 | 0.20 | 0.45 | 86% | 1.0 | 1.5 | 5.2 | 1342 | 2013 | 0.4 | 20 | 12 |
| EX. 3 | 50 | 0.24 | 0.21 | 83% | 1.2 | 2.4 | 7.7 | 254 | 610 | 0.3 | 58 | 25 |
| EX. 4 | 43 | 0.20 | 0.22 | 86% | 5.4 | 9.5 | 21.2 | 857 | 8142 | 0.3 | 72 | 31 |
| EX. 5 | 60 | 0.21 | 0.28 | 84% | 2.2 | 3.1 | 8.4 | 68 | 211 | 2.8 | 71 | 28 |
| EX. 6 | 50 | 0.28 | 0.18 | 80% | 3.6 | 5.4 | 10.1 | 242 | 1307 | 0.2 | 79 | 35 |
| EX. 7 | 50 | 0.42 | 0.12 | 70% | 1.8 | 3.2 | 8.9 | 218 | 698 | 0.3 | 71 | 31 |

TABLE 2-continued

| | Total weight per unit area | Apparent density | Thickness | Porosity | Minimum pore diameter | Average pore diameter (D) | Maximum pore diameter | Number of pores (N) | D × N | Gas permeability | Tensile strength | Piercing strength |
|---|---|---|---|---|---|---|---|---|---|---|---|---|
| EX. 8 | 110 | 0.31 | 0.35 | 77% | 2.8 | 3.9 | 7.1 | 233 | 909 | 0.3 | 129 | 62 |
| EX. 9 | 40 | 0.67 | 0.06 | 52% | 3.1 | 5.6 | 11.4 | 194 | 1086 | 0.3 | 59 | 25 |
| EX. 10 | 60 | 0.32 | 0.19 | 77% | 4.7 | 6.9 | 13.8 | 268 | 1849 | 0.5 | 82 | 31 |
| EX. 11 | 45 | 0.20 | 0.22 | 85% | 3.2 | 5.1 | 11.0 | 201 | 1025 | 4.8 | 55 | 25 |
| EX. 12 | 110 | 0.27 | 0.41 | 81% | 2.9 | 4.2 | 9.1 | 224 | 941 | 0.3 | 132 | 48 |
| EX. 13 | 40 | 0.11 | 0.38 | 92% | 4.0 | 7.8 | 19.2 | 221 | 1724 | 0.3 | 42 | 20 |
| EX. 14 | 50 | 0.24 | 0.21 | 83% | 1.1 | 3.1 | 8.4 | 495 | 1535 | 0.3 | 69 | 31 |
| EX. 15 | 50 | 0.22 | 0.23 | 76% | 3.8 | 4.9 | 10.1 | 192 | 941 | 0.7 | 53 | 28 |
| EX. 16 | 50 | 0.20 | 0.25 | — | 5.1 | 7.0 | 19.2 | 156 | 1092 | 0.5 | 85 | 26 |
| EX. 17 | 43 | 0.18 | 0.24 | 87% | 0.5 | 1.1 | 4.3 | 531 | 584 | 6.1 | 71 | 38 |
| EX. 18 | 50 | 0.28 | 0.18 | 80% | 3.0 | 5.7 | 15.1 | 245 | 1397 | 0.1 | 83 | 24 |
| EX. 19 | 50 | 0.22 | 0.23 | 84% | 4.3 | 6.8 | 16.8 | 210 | 1428 | 0.8 | 63 | 22 |
| EX. 20 | 50 | 0.22 | 0.23 | 84% | 4.3 | 6.8 | 14.2 | 214 | 1455 | 0.8 | 63 | 22 |
| EX. 21 | 50 | 0.22 | 0.23 | 84% | 1.9 | 3.1 | 8.4 | 163 | 505 | 9.7 | 65 | 28 |
| EX. 22 | 80 | 0.14 | 0.56 | 90% | 4.3 | 1.0 | 3.8 | 1842 | 1842 | 0.8 | 15 | 11 |

TABLE 3

| | Specific surface area | Impedance | Volume resistivity | Liquid retention properties | Processing suitability | Battery type | Specific gravity difference of sulfuric acid | Occurrence of short circuit | Cycle characteristics |
|---|---|---|---|---|---|---|---|---|---|
| Conditions Unit | m²/g | mΩ | Ω/□ | % | | | | | |
| EX. 1 | 0.03 | 2.3 | 5.1E+13 | 135 | B | Liquid type | 0.09 | None | 288 |
| EX. 2 | 1.10 | 8.9 | 2.5E+19 | 208 | C | Liquid type | 0.04 | None | 359 |
| EX. 3 | 0.03 | 8.1 | 9.2E+18 | 182 | B | Liquid type | 0.03 | None | 292 |
| EX. 4 | 0.05 | 3.0 | 1.2E+16 | 188 | B | Liquid type | 0.03 | None | 300 |
| EX. 5 | 0.08 | 3.2 | 7.2E+18 | 190 | B | Liquid type | 0.02 | None | 386 |
| EX. 6 | 0.03 | 4.5 | 1.5E+17 | 165 | B | Liquid type | 0.05 | None | 305 |
| EX. 7 | 0..03 | 3.8 | 6.1E+18 | 179 | B | Liquid type | 0.04 | None | 378 |
| EX. 8 | 0.04 | 4.0 | 3.8E+18 | 182 | A | Liquid type | 0.06 | None | 306 |
| EX. 9 | 0.03 | 4.9 | 8.2E+17 | 172 | B | Liquid type | 0.03 | None | 299 |
| EX. 10 | 0.04 | 5.7 | 4.9E+17 | 139 | B | Liquid type | 0.05 | None | 279 |
| EX. 11 | 0.05 | 4.4 | 4.2E+17 | 171 | B | Liquid type | 0.04 | None | 312 |
| EX. 12 | 0.05 | 4.9 | 1.0E+17 | 184 | A | Liquid type | 0.08 | None | 287 |
| EX. 13 | 0.06 | 6.2 | 9.6E+16 | 166 | B | Liquid type | 0.04 | None | 285 |
| EX. 14 | 0.08 | 4.0 | 7.2E+18 | 191 | B | Liquid type | 0.03 | None | 376 |
| EX. 15 | 0.08 | 4.1 | 3.1E+17 | 125 | B | Liquid type | 0.04 | None | 318 |
| EX. 16 | 0.02 | 6.5 | 1.1E+18 | 182 | B | Liquid type | 0.05 | None | 270 |
| EX. 17 | 0.05 | 9.2 | 1.2E+19 | 205 | B | Liquid type | 0.04 | None | 379 |
| EX. 18 | 0.03 | 4.9 | 4.2E+17 | 188 | A | Liquid type | 0.04 | None | 276 |
| EX. 19 | 0.03 | 5.6 | 2.9E+17 | 197 | B | Liquid type | 0.05 | None | 301 |
| EX. 20 | 0.04 | 5.6 | 2.9E+17 | 197 | B | Liquid type | 0.03 | None | 308 |
| EX. 21 | 8.70 | 3.9 | 9.2E+17 | 351 | B | Liquid type | 0.04 | None | 356 |
| EX. 22 | 0.25 | 9.5 | 7.5E+18 | 254 | C | Control valve type | 0.03 | None | 384 |

TABLE 4

| | Properties | | | | | | | | | | | |
|---|---|---|---|---|---|---|---|---|---|---|---|---|
| | Layer II | | | Layer I | | | Layer I | | | Layer II | | |
| | Fiber type | Fiber diameter | Fiber amount | Fiber type | Fiber diameter | Fiber amount | Fiber type | Fiber diameter | Fiber amount | Fiber type | Fiber diameter | Fiber amount |
| Conditions Unit | | μm | g/m² | | μm | g/m² | | μm | g/m² | | μm | g/m² |
| EX. 23 | PP | 15 | 50 | PP | 1.1 | 10 | — | — | — | PP | 15 | 50 |
| EX. 24 | PP | 15 | 15 | PP | 2.0 | 10 | — | — | — | PP | 15 | 15 |
| EX. 25 | PE | 15 | 50 | PE | 1.1 | 10 | — | — | — | PE | 15 | 50 |
| EX. 26 | PE | 15 | 15 | PE | 2.0 | 10 | — | — | — | PE | 15 | 15 |
| EX. 27 | PET | 15 | 20 | PET | 2.0 | 3 | — | — | — | PET | 15 | 20 |

TABLE 4-continued

|  | Properties | | | | | | | | | | | |
|---|---|---|---|---|---|---|---|---|---|---|---|---|
|  | Layer II | | | Layer I | | | Layer I | | | Layer II | | |
|  | Fiber type | Fiber diameter | Fiber amount | Fiber type | Fiber diameter | Fiber amount | Fiber type | Fiber diameter | Fiber amount | Fiber type | Fiber diameter | Fiber amount |
| EX. 28 | PET | 15 | 20 | PET | 0.3 | 20 | — | — | — | PET | 15 | 20 |
| EX. 29 | — | — | — | PET | 2.5 | 90 | — | — | — | — | — | — |
| EX. 30 | PET | 15 | 40 | PET | 2.0 | 10 | — | — | — | — | — | — |
| EX. 31 | PET | 15 | 20 | PET | 2.0 | 3 | — | — | — | PET | 15 | 20 |
| EX. 32 | PET | 15 | 20 | PET | 0.3 | 20 | — | — | — | PET | 15 | 20 |
| EX. 33 | PET | 15 | 20 | PET | 2.0 | 10 | — | — | — | PET | 15 | 20 |
| EX. 34 | PET | 15 | 20 | PET | 2.0 | 10 | — | — | — | PET | 15 | 20 |
| EX. 35 | PET | 15 | 50 | PET | 2.0 | 10 | — | — | — | PET | 15 | 50 |
| EX. 36 | PET | 15 | 15 | PET | 2.0 | 10 | — | — | — | PET | 15 | 15 |
| EX. 37 | PET | 15 | 20 | PET | 2.0 | 20 | — | — | — | PET | 15 | 20 |
| EX. 38 | PET | 15 | 20 | PET | 3.0 | 5 | — | — | — | PET | 15 | 20 |
| EX. 39 | PET | 15 | 50 | PET | 1.1 | 10 | — | — | — | PET | 15 | 50 |
| EX. 40 | PET | 15 | 15 | PET | 2.0 | 10 | — | — | — | PET | 15 | 15 |
| EX. 41 | PET | 15 | 20 | PET | 2.0 | 10 | PET | 2.0 | 10 | PET | 15 | 20 |
| EX. 42 | PP | 15 | 20 | PP | 2.0 | 10 | — | — | — | PP | 15 | 20 |
| EX. 43 | PET/Co-PET | 15 | 20 | PET | 2.0 | 10 | — | — | — | PET | 15 | 20 |
| EX. 44 | PET | 15 | 20 | PET | 2.0 | 10 | — | — | — | PET | 15 | 20 |
| EX. 45 | PET | 15 | 20 | PET | 2.0 | 10 | — | — | — | PET | 15 | 20 |
| EX. 46 | PET | 15 | 20 | PET | 2.0 | 10 | — | — | — | PET | 15 | 20 |
| EX. 47 | — | — | — | PET | 0.8 | 80 | — | — | — | — | — | — |

TABLE 5

|  | Total weight per unit area | Apparent density | Thickness | Porosity | Minimum pore diameter | Average pore diameter (D) | Maximum pore diameter | Number of pores (N) | D × N | Gas permeability | Tensile strength | Piercing strength |
|---|---|---|---|---|---|---|---|---|---|---|---|---|
| Conditions |  |  |  | AVE. |  |  |  |  |  |  | width 15 mm |  |
| Unit | g/m² | g/cm³ | mm |  | μm | μm | μm |  |  | sec/100 mL | N | N |
| EX. 23 | 110 | 0.28 | 0.40 | 70% | 2.8 | 4.5 | 9.8 | 210 | 945 | 0.3 | 121 | 35 |
| EX. 24 | 40 | 0.10 | 0.39 | 89% | 4.3 | 8.1 | 20.1 | 212 | 1717 | 0.2 | 48 | 23 |
| EX. 25 | 110 | 0.28 | 0.39 | 69% | 3.1 | 4.3 | 9.7 | 194 | 834 | 0.3 | 115 | 29 |
| EX. 26 | 40 | 0.10 | 0.39 | 89% | 3.7 | 7.9 | 16.6 | 179 | 1414 | 0.2 | 45 | 21 |
| EX. 27 | 43 | 0.20 | 0.21 | 85% | 5.4 | 9.5 | 21.2 | 678 | 6441 | 0.3 | 70 | 30 |
| EX. 28 | 60 | 0.21 | 0.29 | 85% | 2.2 | 3.1 | 8.4 | 105 | 326 | 2.9 | 81 | 30 |
| EX. 29 | 90 | 0.23 | 0.40 | 84% | 1.1 | 1.3 | 6.3 | 1341 | 1743 | 0.5 | 19 | 11 |
| EX. 30 | 50 | 0.23 | 0.22 | 84% | 1.1 | 2.2 | 7.9 | 432 | 950 | 0.3 | 18 | 23 |
| EX. 31 | 43 | 0.13 | 0.34 | 91% | 5.5 | 10.4 | 22.5 | 145 | 1508 | 0.2 | 71 | 30 |
| EX. 32 | 60 | 0.21 | 0.28 | 84% | 3.2 | 3.2 | 9.2 | 387 | 1238 | 2.9 | 70 | 29 |
| EX. 33 | 50 | 0.26 | 0.19 | 81% | 3.3 | 5.5 | 10.0 | 234 | 1287 | 0.3 | 74 | 38 |
| EX. 34 | 50 | 0.42 | 0.12 | 70% | 1.9 | 3.1 | 8.8 | 298 | 924 | 0.4 | 73 | 31 |
| EX. 35 | 110 | 0.31 | 0.36 | 78% | 2.9 | 4.2 | 7.3 | 243 | 1021 | 0.4 | 121 | 73 |
| EX. 36 | 40 | 0.67 | 0.06 | 52% | 3.2 | 6.2 | 12.4 | 200 | 1240 | 0.1 | 60 | 26 |
| EX. 37 | 60 | 0.33 | 0.18 | 76% | 4.8 | 7.1 | 13.2 | 276 | 1960 | 0.5 | 81 | 30 |
| EX. 38 | 45 | 0.21 | 0.21 | 84% | 3.1 | 6.2 | 12.1 | 211 | 1308 | 4.9 | 45 | 27 |
| EX. 39 | 110 | 0.28 | 0.40 | 80% | 2.8 | 4.3 | 10.1 | 243 | 1045 | 0.4 | 130 | 49 |
| EX. 40 | 40 | 0.10 | 0.39 | 93% | 4.2 | 7.9 | 19.3 | 254 | 2007 | 0.5 | 43 | 22 |
| EX. 41 | 50 | 0.24 | 0.21 | 83% | 1.4 | 3.3 | 8.8 | 499 | 1647 | 2.0 | 81 | 33 |
| EX. 42 | 50 | 0.23 | 0.22 | 75% | 3.9 | 5.0 | 10.2 | 198 | 990 | 0.8 | 63 | 29 |
| EX. 43 | 50 | 0.28 | 0.18 | 80% | 3.2 | 5.6 | 15.4 | 243 | 1361 | 0.2 | 88 | 28 |
| EX. 44 | 50 | 0.21 | 0.24 | 85% | 4.2 | 6.9 | 16.5 | 211 | 1456 | 0.9 | 63 | 23 |
| EX. 45 | 50 | 0.22 | 0.23 | 84% | 4.8 | 7.2 | 14.3 | 215 | 1548 | 0.9 | 65 | 22 |
| EX. 46 | 50 | 0.23 | 0.22 | 84% | 1.2 | 3.3 | 8.8 | 167 | 551 | 9.8 | 66 | 29 |
| EX. 47 | 80 | 0.13 | 0.60 | 90% | 44.0 | 1.2 | 3.9 | 1574 | 1889 | 1.0 | 18 | 14 |

TABLE 6

| | Specific surface area | Impedance | Volume resistivity | Liquid retention properties | Processing suitability | Battery type | Specific gravity difference of sulfuric acid | Occurrence of short circuit | Cycle characteristics |
|---|---|---|---|---|---|---|---|---|---|
| Conditions Unit | $m^2/g$ | $m\Omega$ | $\Omega/\square$ | % | | | | | |
| EX. 23 | 0.31 | 15.2 | 2.3E+17 | 164 | A | Liquid type | 0.12 | None | 234 |
| EX. 24 | 0.24 | 9.8 | 6.6E+16 | 148 | B | Liquid type | 0.09 | None | 225 |
| EX. 25 | 0.30 | 14.9 | 3.5E+17 | 158 | A | Liquid type | 0.11 | None | 215 |
| EX. 26 | 0.22 | 9.9 | 8.9E+16 | 143 | B | Liquid type | 0.10 | None | 208 |
| EX. 27 | 0.07 | 3.1 | 1.2E+17 | 199 | B | Liquid type | 0.02 | None | 349 |
| EX. 28 | 0.09 | 3.3 | 7.8E+18 | 198 | B | Liquid type | 0.02 | None | 439 |
| EX. 29 | 1.82 | 92.0 | 3.5E+19 | 234 | C | Liquid type | 0.03 | None | 412 |
| EX. 30 | 0.32 | 98.0 | 9.3E+19 | 204 | B | Liquid type | 0.02 | None | 314 |
| EX. 31 | 0.21 | 3.2 | 1.2E+16 | 221 | B | Liquid type | 0.02 | None | 345 |
| EX. 32 | 0.81 | 3.8 | 7.0E+18 | 214 | B | Liquid type | 0.01 | None | 456 |
| EX. 33 | 0.31 | 4.5 | 1.0E+17 | 185 | B | Liquid type | 0.03 | None | 321 |
| EX. 34 | 0.35 | 3.9 | 6.5E+18 | 204 | B | Liquid type | 0.03 | None | 450 |
| EX. 35 | 0.34 | 4.1 | 3.4E+18 | 219 | A | Liquid type | 0.03 | None | 356 |
| EX. 36 | 0.28 | 5.0 | 8.2E+17 | 192 | B | Liquid type | 0.01 | None | 381 |
| EX. 37 | 0.39 | 5.8 | 5.0E+17 | 163 | B | Liquid type | 0.03 | None | 305 |
| EX. 38 | 0.34 | 4.9 | 4.1E+17 | 190 | B | Liquid type | 0.01 | None | 351 |
| EX. 39 | 0.38 | 5.0 | 1.3E+17 | 213 | A | Liquid type | 0.05 | None | 302 |
| EX. 40 | 0.29 | 6.2 | 9.2E+16 | 108 | B | Liquid type | 0.02 | None | 314 |
| EX. 41 | 0.44 | 3.8 | 7.8E+18 | 257 | B | Liquid type | 0.02 | None | 438 |
| EX. 42 | 0.38 | 4.4 | 2.9E+17 | 158 | B | Liquid type | 0.03 | None | 324 |
| EX. 43 | 0.39 | 4.8 | 3.8E+17 | 208 | A | Liquid type | 0.03 | None | 300 |
| EX. 44 | 0.32 | 5.7 | 3.5E+17 | 228 | B | Liquid type | 0.04 | None | 347 |
| EX. 45 | 0.31 | 5.7 | 3.2E+17 | 205 | B | Liquid type | 0.02 | None | 368 |
| EX. 46 | 9.50 | 4.2 | 8.8E+17 | 402 | B | Liquid type | 0.02 | None | 401 |
| EX. 47 | 0.38 | 9.8 | 8.6E+18 | 287 | C | Control valve type | 0.01 | None | 422 |

TABLE 7

| | Substrate structure | | | | | | | | Total weight per unit area | Apparent density | Thickness |
|---|---|---|---|---|---|---|---|---|---|---|---|
| | Layer II | | | Layer I | | | Layer II | | | | |
| | Fiber type | Fiber diameter | Fiber amount | Fiber type | Fiber diameter | Fiber amount | Fiber type | Fiber diameter | Fiber amount | | | |
| Conditions Unit | | μm | $g/m^2$ | | μm | $g/m^2$ | | μm | $g/m^2$ | $g/m^2$ | $g/cm^3$ | AVE. mm |
| EX. 48 | PET | 15 | 20 | PET | 2.0 | 10 | PET | 15 | 20 | 50 | 0.28 | 0.18 |
| EX. 49 | PET | 15 | 20 | PET | 3.0 | 10 | PET | 15 | 20 | 50 | 0.28 | 0.18 |
| EX. 50 | PET | 15 | 20 | PET | 2.0 | 10 | PET | 15 | 20 | 50 | 0.26 | 0.19 |
| EX. 51 | PET | 15 | 20 | PET | 3.2 | 5 | PET | 15 | 20 | 45 | 0.30 | 0.15 |
| EX. 52 | PET | 15 | 20 | PET | 0.3 | 40 | PET | 15 | 20 | 80 | 0.32 | 0.25 |
| EX. 53 | PET | 15 | 20 | PET | 2.0 | 10 | PET | 15 | 20 | 50 | 0.28 | 0.18 |
| EX. 54 | PET | 15 | 20 | PET | 2.0 | 10 | PET | 15 | 20 | 50 | 0.28 | 0.18 |
| EX. 55 | PET | 15 | 50 | PET | 2.0 | 25 | PET | 15 | 50 | 125 | 0.32 | 0.39 |
| EX. 56 | PET | 15 | 5 | PET | 2.0 | 2 | PET | 15 | 5 | 12 | 0.60 | 0.02 |
| EX. 57 | PET | 15 | 20 | PET | 2.0 | 10 | PET | 15 | 20 | 50 | 0.28 | 0.18 |
| EX. 58 | PET | 15 | 20 | PET | 2.0 | 10 | PET | 15 | 20 | 50 | 0.28 | 0.18 |
| EX. 59 | PET | 15 | 20 | PET | 2.0 | 10 | PET | 15 | 20 | 50 | 0.28 | 0.18 |

TABLE 7-continued

| | | Substrate structure | | | Inorganic material | | | |
|---|---|---|---|---|---|---|---|---|
| | | Porosity | Average pore diameter | Gas permeability | Kind of inorganic material | Weight per unit area | Inorganic material particle diameter | Specific surface area | Ratio of binder/inorganic material |
| Conditions Unit | | % | μm | sec/100 mL | | g/m² | nm | m²/g | % |
| | EX. 48 | 80% | 6.2 | 1.1 | silica | 5.3 | 12 | 210 | 0.1 |
| | EX. 49 | 80% | 13.5 | 0.5 | silica | 1.5 | 12 | 210 | 0.1 |
| | EX. 50 | 81% | 6.2 | 1.1 | silica | 48.4 | 12 | 210 | 0.1 |
| | EX. 51 | 78% | 18.4 | 0.2 | silica | 5.8 | 12 | 210 | 0.1 |
| | EX. 52 | 77% | 1.8 | 17.2 | silica | 4.9 | 12 | 210 | 0.1 |
| | EX. 53 | 80% | 6.2 | 1.1 | silica | 1.2 | 12 | 210 | 0.1 |
| | EX. 54 | 80% | 6.2 | 1.1 | silica | 52.3 | 12 | 210 | 0.1 |
| | EX. 55 | 77% | 3.8 | 11.3 | silica | 4.8 | 12 | 210 | 0.1 |
| | EX. 56 | 57% | 21.9 | 0.1 | silica | 5.1 | 12 | 210 | 0.1 |
| | EX. 57 | 80% | 6.2 | 1.1 | silica | 5.8 | 8 | 3 | 0.1 |
| | EX. 58 | 80% | 6.2 | 1.1 | silica | 5.2 | 298 | 89 | 0.1 |
| | EX. 59 | 80% | 6.2 | 1.1 | silica | 5.0 | 3 | 321 | 0.1 |

TABLE 8

| | Separator physical properties | | | | | | | |
|---|---|---|---|---|---|---|---|---|
| | Thickness | Gas permeability | Average pore diameter (D) | Number of pores (N) | D * N | Contact angle | Tensile strength Width 15 mm | Piercing strength | Specific surface area |
| Conditions Unit | μm | sec/100 mL | μm | | | Degree | N | N | m²/g |
| EX. 48 | 0.18 | 1.8 | 5.1 | 208 | 1061 | 24.8 | 72 | 31 | 5.3 |
| EX. 49 | 0.18 | 0.7 | 11.2 | 199 | 2229 | 75.2 | 78 | 38 | 4.3 |
| EX. 50 | 0.20 | 35.3 | 2.0 | 159 | 318 | 3.8 | 72 | 31 | 39.5 |
| EX. 51 | 0.15 | 0.5 | 15.3 | 251 | 3840 | 20.3 | 70 | 30 | 8.8 |
| EX. 52 | 0.25 | 18.9 | 1.5 | 278 | 417 | 26.8 | 93 | 42 | 6.5 |
| EX. 53 | 0.18 | 1.6 | 4.2 | 242 | 1016 | 83.4 | 72 | 31 | 2.3 |
| EX. 54 | 0.20 | 41.2 | 1.8 | 298 | 536 | 1.2 | 72 | 31 | 44.9 |
| EX. 55 | 0.39 | 11.9 | 3.1 | 238 | 738 | 27.4 | 176 | 85 | 5.6 |
| EX. 56 | 0.02 | 0.8 | 19.4 | 199 | 3861 | 26.5 | 10 | 9 | 9.4 |
| EX. 57 | 0.18 | 1.6 | 5.4 | 258 | 1393 | 25.4 | 72 | 31 | 4.5 |
| EX. 58 | 0.18 | 1.4 | 5.5 | 244 | 1342 | 25.9 | 72 | 31 | 13.1 |
| EX. 59 | 0.18 | 1.3 | 5.8 | 287 | 1665 | 27.2 | 72 | 31 | 6.3 |

| | Separator physical properties | | Processing suitability | Battery evaluation | | | |
|---|---|---|---|---|---|---|---|
| | Impedance | Volume resistivity | | Battery type | Specific gravity difference of sulfuric acid | Occurrence of short circuit | Cycle characteristics |
| Conditions Unit | mΩ | Ω/□ | | | | | |
| EX. 48 | 1.5 | 1.1E+15 | A | Liquid type | 0.07 | None | 872 |
| EX. 49 | 1.2 | 2.8E+12 | A | Liquid type | 0.06 | None | 915 |
| EX. 50 | 8.2 | 9.4E+16 | A | Liquid type | 0.03 | None | 1024 |
| EX. 51 | 1.5 | 1.0E+12 | A | Liquid type | 0.05 | None | 925 |
| EX. 52 | 5.4 | 1.4E+17 | A | Liquid type | 0.05 | None | 930 |
| EX. 53 | 1.4 | 9.8E+14 | A | Liquid type | 0.07 | None | 890 |
| EX. 54 | 3.3 | 1.0E+17 | A | Liquid type | 0.03 | None | 1011 |
| EX. 55 | 9.5 | 5.6E+14 | A | Liquid type | 0.03 | None | 1035 |
| EX. 56 | 1.1 | 9.3E+11 | A | Liquid type | 0.08 | None | 830 |
| EX. 57 | 1.4 | 7.2E+14 | A | Liquid type | 0.09 | None | 642 |

TABLE 8-continued

| | | | | | | | |
|---|---|---|---|---|---|---|---|
| EX. 58 | 1.3 | 7.1E+14 | A | Liquid type | 0.05 | None | 902 |
| EX. 59 | 1.2 | 8.9E+14 | A | Liquid type | 0.05 | None | 910 |

TABLE 9

| | Substrate structure | | | | | | | | | |
|---|---|---|---|---|---|---|---|---|---|---|
| | Layer II | | | Layer I | | | Layer II | | | Total weight per unit area | Apparent density |
| | Fiber type | Fiber diameter | Fiber amount | Fiber type | Fiber diameter | Fiber amount | Fiber type | Fiber diameter | Fiber amount | | |
| Conditions Unit | | μm | g/m² | | μm | g/m² | | μm | g/m² | g/m² | g/cm³ |
| EX. 60 | PET | 15 | 20 | PET | 2.0 | 10 | PET | 15 | 20 | 50 | 0.28 |
| EX. 61 | PET | 15 | 20 | PET | 2.0 | 10 | PET | 15 | 20 | 50 | 0.28 |
| EX. 62 | PET | 15 | 20 | PET | 2.0 | 10 | PET | 15 | 20 | 50 | 0.28 |
| EX. 63 | PET | 15 | 20 | PET | 2.0 | 10 | PET | 15 | 20 | 50 | 0.28 |
| EX. 64 | PET | 4.9 | 50 | — | — | — | — | — | — | 50 | 0.20 |
| EX. 65 | PP | 15 | 20 | PP | 2.0 | 10 | PP | 15 | 20 | 50 | 0.25 |
| EX. 66 | PET | 15 | 20 | PET | 2.0 | 10 | PET | 15 | 20 | 50 | 0.17 |
| EX. 67 | PET | 15 | 20 | PET | 2.0 | 10 | PET | 15 | 20 | 50 | 0.79 |
| EX. 68 | PET | 15 | 20 | PET | 3.1 | 5 | PET | 15 | 20 | 45 | 0.24 |
| EX. 69 | PET | 15 | 20 | PET | 0.3 | 20 | PET | 15 | 20 | 60 | 0.26 |
| EX. 70 | PET | 15 | 20 | PET | 0.1 | 10 | PET | 15 | 20 | 50 | 0.28 |
| EX. 71 | PET | 12.0 | 50 | — | — | — | — | — | — | 50 | 0.20 |
| EX. 72 | — | — | — | PET | 0.8 | 80 | — | — | — | 80 | 0.33 |
| EX. 73 | PET | 15 | 40 | PET | 1.2 | 10 | PET | | | 50 | 0.42 |
| EX. 74 | Cel | 20 | 50 | Cel | | | Cel | | | 50 | 0.45 |
| EX. 75 | Co-PET | 15 | 20 | PET | 2.0 | 10 | PET | 15 | 20 | 50 | 0.33 |
| EX. 76 | PET | 15 | 20 | PET | 2.0 | 10 | PET | 15 | 20 | 50 | 0.28 |
| EX. 77 | PET | 15 | 20 | PET | 2.0 | 10 | PET | 15 | 20 | 50 | 0.28 |
| EX. 78 | — | — | — | PET | 0.8 | 80 | — | — | — | 80 | 0.33 |

| | Substrate structure | | | | Inorganic material | | | | |
|---|---|---|---|---|---|---|---|---|---|
| | Thickness | Porosity | Average pore diameter | Gas permeability | Kind of inorganic material | Weight per unit area | Inorganic material particle diameter | Specific surface area | Ratio of binder/inorganic material |
| Conditions Unit | AVE. mm | % | μm | sec/100 mL | | g/m² | nm | m²/g | |
| EX. 60 | 0.18 | 80% | 6.2 | 1.1 | silica | 4.9 | 12 | 210 | 0.1 |
| EX. 61 | 0.18 | 80% | 6.2 | 1.1 | silica | 4.4 | 12 | 210 | 0.1 |
| EX. 62 | 0.18 | 80% | 6.2 | 1.1 | silica | 4.9 | 12 | 210 | 3.0 |
| EX. 63 | 0.18 | 80% | 6.2 | 1.1 | silica | 5.1 | 12 | 210 | 0.05 |
| EX. 64 | 0.25 | 86% | 15.9 | 0.7 | silica | 3.2 | 12 | 210 | 0.1 |
| EX. 65 | 0.20 | 73% | 5.3 | 3.5 | silica | 5.9 | 12 | 210 | 0.1 |
| EX. 66 | 0.30 | 88% | 8.4 | 0.9 | silica | 8.3 | 12 | 210 | 0.1 |
| EX. 67 | 0.06 | 42% | 4.3 | 3.0 | silica | 5.8 | 12 | 210 | 0.1 |
| EX. 68 | 0.19 | 83% | 17.3 | 0.4 | silica | 6.3 | 12 | 210 | 0.1 |
| EX. 69 | 0.23 | 81% | 2.3 | 15.2 | silica | 4.6 | 12 | 210 | 0.1 |
| EX. 70 | 0.18 | 80% | 2.8 | 6.9 | silica | 5.0 | 12 | 210 | 0.1 |
| EX. 71 | 0.25 | 86% | 23.9 | 0.1 | silica | 8.2 | 12 | 210 | 0.1 |
| EX. 72 | 0.24 | 76% | 1.8 | 13.4 | silica | 5.9 | 12 | 210 | 0.1 |
| EX. 73 | 0.12 | 70% | 9.4 | 1.0 | silica | 6.1 | 12 | 210 | 0.1 |
| EX. 74 | 0.11 | 70% | 14.5 | 1.6 | silica | 5.1 | 12 | 210 | 0.1 |
| EX. 75 | 0.15 | 76% | 6.2 | 1.1 | silica | 4.7 | 12 | 210 | 0.1 |
| EX. 76 | 0.18 | 80% | 6.2 | 1.1 | silica | 5.0 | 12 | 210 | 0.1 |
| EX. 77 | 0.18 | 80% | 6.2 | 1.1 | silica | 4.8 | 12 | 210 | 0.1 |
| EX. 78 | 0.24 | 76% | 1.8 | 13.4 | silica | 5.9 | 12 | 210 | 0.1 |

TABLE 10

| | Separator physical properties | | | | | | | | |
|---|---|---|---|---|---|---|---|---|---|
| Conditions | Thickness | Gas permeability | Average pore diameter (D) | Number of pores (N) | D * N | Contact angle | Tensile strength Width 15 mm | Piercing strength | Specific surface area |
| Unit | μm | sec/100 mL | μm | | | Degree | N | N | m²/g |
| EX. 60 | 0.18 | 1.3 | 5.8 | 199 | 1154 | 27.0 | 72 | 31 | 4.9 |
| EX. 61 | 0.18 | 1.2 | 5.7 | 208 | 1186 | 28.4 | 72 | 31 | 5.4 |
| EX. 62 | 0.18 | 1.4 | 5.5 | 159 | 875 | 26.5 | 72 | 31 | 1.9 |
| EX. 63 | 0.18 | 1.8 | 5.9 | 258 | 1522 | 25.3 | 72 | 31 | 7.2 |
| EX. 64 | 0.25 | 0.9 | 14.1 | 199 | 2806 | 29.8 | 58 | 25 | 3.5 |
| EX. 65 | 0.20 | 4.8 | 4.1 | 208 | 853 | 25.3 | 64 | 28 | 8.7 |
| EX. 66 | 0.30 | 1.5 | 7.6 | 211 | 1604 | 22.1 | 65 | 28 | 12.5 |
| EX. 67 | 0.06 | 5.6 | 4.0 | 259 | 1036 | 26.2 | 89 | 38 | 8.0 |
| EX. 68 | 0.19 | 1.0 | 15.2 | 217 | 3298 | 23.9 | 73 | 32 | 8.2 |
| EX. 69 | 0.23 | 19.8 | 2.0 | 228 | 456 | 26.8 | 69 | 30 | 9.5 |
| EX. 70 | 0.18 | 7.2 | 2.1 | 225 | 473 | 25.4 | 68 | 28 | 5.9 |
| EX. 71 | 0.25 | 0.3 | 28.9 | 209 | 6040 | 22.1 | 45 | 27 | 3.1 |
| EX. 72 | 0.24 | 14.5 | 1.2 | 217 | 260 | 28.2 | 20 | 27 | 6.2 |
| EX. 73 | 0.12 | 1.5 | 9.0 | 288 | 2592 | 25.8 | 69 | 29 | 7.1 |
| EX. 74 | 0.11 | 1.9 | 14.2 | 235 | 3337 | 26.4 | 68 | 29 | 6.7 |
| EX. 75 | 0.15 | 2.0 | 5.9 | 156 | 920 | 27.5 | 70 | 29 | 5.8 |
| EX. 76 | 0.18 | 1.3 | 5.8 | 173 | 1003 | 26.1 | 72 | 31 | 5.2 |
| EX. 77 | 0.18 | 1.5 | 5.5 | 175 | 963 | 25.9 | 72 | 31 | 4.9 |
| EX. 78 | 0.24 | 14.5 | 1.2 | 306 | 367 | 24.5 | 20 | 27 | 12.3 |

| | Separator physical properties | | Processing suitability | Battery evaluation | | | |
|---|---|---|---|---|---|---|---|
| | Impedance | Volume resistivity | | Battery type | Specific gravity difference of sulfuric acid | Occurrence of short circuit | Cycle characteristics |
| Conditions Unit | mΩ | Ω/□ | | | | | |
| EX. 60 | 1.2 | 8.5E+14 | A | Liquid type | 0.08 | None | 879 |
| EX. 61 | 1.1 | 8.0E+14 | A | Liquid type | 0.03 | None | 1004 |
| EX. 62 | 1.3 | 8.0E+14 | A | Liquid type | 0.09 | None | 684 |
| EX. 63 | 1.7 | 8.8E+14 | A | Liquid type | 0.04 | None | 933 |
| EX. 64 | 1.0 | 2.3E+13 | A | Liquid type | 0.08 | None | 532 |
| EX. 65 | 3.2 | 1.4E+15 | A | Liquid type | 0.09 | None | 603 |
| EX. 66 | 1.4 | 9.9E+13 | A | Liquid type | 0.03 | None | 997 |
| EX. 67 | 5.0 | 1.0E+15 | A | Liquid type | 0.05 | None | 929 |
| EX. 68 | 0.9 | 1.1E+13 | A | Liquid type | 0.07 | None | 804 |
| EX. 69 | 4.3 | 9.3E+16 | A | Liquid type | 0.05 | None | 911 |
| EX. 70 | 2.8 | 8.8E+16 | A | Liquid type | 0.02 | None | 1202 |
| EX. 71 | 0.3 | 5.4E+11 | A | Liquid type | 0.08 | None | 649 |
| EX. 72 | 3.9 | 3.2E+17 | B | Liquid type | 0.04 | None | 956 |
| EX. 73 | 1.4 | 8.8E+12 | A | Liquid type | 0.05 | None | 916 |
| EX. 74 | 1.7 | 2.5E+12 | A | Liquid type | 0.07 | None | 808 |
| EX. 75 | 1.8 | 7.8E+14 | A | Liquid type | 0.08 | None | 712 |
| EX. 76 | 1.3 | 8.3E+14 | A | Liquid type | 0.05 | None | 911 |
| EX. 77 | 1.4 | 8.0E+14 | B | Control valvet ype | 0.04 | None | 937 |
| EX. 78 | 3.9 | 3.2E+17 | A | Liquid type | 0.02 | None | 1083 |

TABLE 11

| | Properties | | | | | | | | | | |
|---|---|---|---|---|---|---|---|---|---|---|---|
| | Layer II | | | Layer I | | | Layer I | | | Layer II | | |
| | Fiber type | Fiber diameter | Fiber amount | Fiber type | Fiber diameter | Fiber amount | Fiber type | Fiber diameter | Fiber amount | Fiber type | Fiber diameter | Fiber amount |
| Conditions Unit | | μm | g/m² | | μm | g/m² | | μm | g/m² | | μm | g/m² |
| Comp-Ex. 1 | — | — | — | PE | — | — | — | — | — | — | — | — |
| Comp-Ex. 2 | — | — | — | PE | — | — | — | — | — | — | — | — |
| Comp-Ex. 3 | — | — | — | Glass | 0.8 | 340 | — | — | — | — | — | — |
| Comp-Ex. 4 | — | — | — | PET | 1.8 | 300 | — | — | — | — | — | — |

TABLE 12

| | Total weight per unit area | Apparent density | Thickness | Porosity | Minimum pore diameter | Average pore diameter (D) | Maximum pore diameter | Number of pores (N) | D * N | Gas permeability | Tensile strength | Piercing strength | Specific surface area |
|---|---|---|---|---|---|---|---|---|---|---|---|---|---|
| Conditions | | AVE. | | | | | | | | | width 15 mm | | |
| Unit | g/m² | g/cm³ | mm | | μm | μm | μm | | | sec/100 mL | N | N | m²/g |
| Comp-Ex. 1 | 95 | 0.54 | 0.18 | 42% | 0.01 | 0.03 | 0.10 | 2048 | 61 | 28.0 | 18 | 25 | Unmeasurable |
| Comp-Ex. 2 | 95 | 0.54 | 0.18 | 42% | 0.0 | 0.0 | 0.1 | 2587 | 78 | 28.0 | 18 | 25 | Unmeasurable |
| Comp-Ex. 3 | 340 | 0.16 | 2.12 | 95% | 0.6 | 1.3 | 5.0 | 168 | 218 | 3.2 | 39 | 20 | 0.82 |
| Comp-Ex. 4 | 300 | 0.17 | 1.80 | 88% | Unmeasurable | Unmeasurable | Unmeasurable | 459 | — | 0.0 | 135 | 18 | 0.04 |

TABLE 13

| | Impedance | Volume resistivity | Liquid retention properties | Processing suitability | Battery type | Specific gravity difference of sulfuric acid | Occurrence of short circuit | Cycle characteristics |
|---|---|---|---|---|---|---|---|---|
| Conditions Unit | mΩ | Ω/□ | % | | | | | |
| Comp-Ex. 1 | 26.0 | 3.8E+20 | 118 | B | Liquid type | 0.18 | None | 122 |
| Comp-Ex. 2 | 26.0 | 3.8E+20 | 118 | B | Liquid type | 0.16 | None | 135 |
| Comp-Ex. 3 | 15.8 | 7.6E+18 | 307 | C | Control valve type | 0.04 | None | 255 |
| Comp-Ex. 4 | 1.2 | 5.1E+08 | 105 | C | Liquid type | 0.15 | Occurred | 140 |

INDUSTRIAL APPLICABILITY

The nonwoven fabric separator obtained by the present invention has the optimum material and the highly controlled structure, and thus is excellent in ion permeability, liquid retention properties, electrical insulation properties, and chemical stability. Additionally, processing suitability as a battery is also excellent, and the lead storage battery of the present invention includes the nonwoven fabric mat of the present invention, whereby the lead storage battery can be produced in a stable production process, with good yield, and at low cost. Furthermore, the lead storage battery of the present invention exhibits high output and low resistance, and has a very long-life cycle, so that the lead storage battery is suitably used.

The invention claimed is:

1. A nonwoven fabric separator for a lead storage battery, comprising a nonwoven fabric composed of a recycled fiber or synthetic fiber, wherein a relationship between the average pore diameter (D) of the nonwoven fabric separator and the number of pores (N) satisfies the following equation:

$$1.0 \times 10^2 < D*N < 1.0 \times 10^4$$

and the nonwoven fabric separator includes at least two layers which are integrated by a calender roll at a line pressure of 100 N/cm to 1000 N/cm, wherein the nonwoven fabric separator has a tensile strength of from 15 N/15 mm to 300 N/15 mm, and wherein the nonwoven fabric separator has a specific surface area of from 0.1 m$^2$/g to 50 m$^2$/g.

2. The separator according to claim 1, wherein the nonwoven fabric separator has an average pore diameter of from 0.1 µm to 50 µm.

3. The separator according to claim 1, wherein the nonwoven fabric separator has a thickness of from 30 µm to 1000 µm and a weight per unit area of from 5 g/m$^2$ to 300 g/m$^2$.

4. The separator according to claim 1, wherein the nonwoven fabric separator has a porosity of from 30% to 95%.

5. The separator according to claim 1, wherein the nonwoven fabric is composed of a continuous long fiber as defined by JIS-L0222.

6. The separator according to claim 1, wherein the nonwoven fabric includes an ultrafine fiber having a fiber diameter of from 0.1 µm to 5 µm.

7. The separator according to claim 6, wherein the nonwoven fabric separator includes at least two layers including a nonwoven fabric layer (layer I) composed of the ultrafine fiber and a nonwoven fabric layer (layer II) composed of a fiber having a fiber diameter of from 5 µm to 30 µm.

8. The separator according to claim 7, wherein the nonwoven fabric separator includes three layers in which the layer I is arranged as an intermediate layer between the layer II and the layer II.

9. The separator according to claim 1, wherein the nonwoven fabric separator is composed of the synthetic fiber.

10. The separator according to claim 1, wherein the nonwoven fabric separator is composed of a polyester fiber.

11. The separator according to claim 1, wherein the nonwoven fabric separator is composed of a polyolefin fiber.

12. The separator according to claim 1, wherein the nonwoven fabric separator has a gas permeability of from 0.01 seconds/100 cc to 10 seconds/100 cc.

13. The separator according to claim 1, wherein the nonwoven fabric separator is a hydrophilized nonwoven fabric.

14. The separator according to claim 1, wherein the nonwoven fabric separator is a nonwoven fabric integrated by thermal bonding.

15. The separator according to claim 1, wherein the nonwoven fabric separator includes a nonwoven fabric substrate having a void space structure and inorganic particles present on a surface portion of the nonwoven fabric substrate or on a fiber surface inside the nonwoven fabric substrate.

16. The separator according to claim 15, wherein the inorganic particles include a silicon component.

17. The separator according to claim 15, wherein the inorganic particles have an average particle diameter of from 1 nm to 5000 nm.

18. The separator according to claim 15, wherein the inorganic particles have a specific surface area of from 0.1 m$^2$/g to 1000 m$^2$/g.

19. The separator according to claim 15, wherein the nonwoven fabric separator includes a binder present inside the nonwoven fabric substrate in an amount of from 1 to 500 parts by weight with respect to 100 parts by weight of the inorganic particles.

20. The separator according to claim 1, wherein the nonwoven fabric separator is heat-sealable.

21. The separator according to claim 1, wherein the nonwoven fabric separator is composed of the synthetic fiber, and the synthetic fiber is one or more kinds selected from a polyester fiber and a polyolefin fiber.

\* \* \* \* \*